(12) United States Patent
Lim et al.

(10) Patent No.: US 12,418,371 B2
(45) Date of Patent: *Sep. 16, 2025

(54) TECHNIQUE FOR CONFIGURING PREAMBLE IN WIRELESS COMMUNICATION SYSTEM

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

This patent is subject to a terminal disclaimer.

(21) Appl. No.: 17/910,625

(22) PCT Filed: Mar. 12, 2021

(86) PCT No.: PCT/KR2021/003103
§ 371 (c)(1),
(2) Date: Oct. 7, 2022

(87) PCT Pub. No.: WO2021/182915
PCT Pub. Date: Sep. 16, 2021

(65) Prior Publication Data
US 2023/0147175 A1     May 11, 2023

(30) Foreign Application Priority Data

Mar. 12, 2020  (KR) .................. 10-2020-0030985
Mar. 18, 2020  (KR) .................. 10-2020-0033444
Mar. 18, 2020  (KR) .................. 10-2020-0033445

(51) Int. Cl.
*H04L 5/00* (2006.01)
*H04W 84/12* (2009.01)

(52) U.S. Cl.
CPC .......... *H04L 5/0044* (2013.01); *H04L 5/0094* (2013.01); *H04W 84/12* (2013.01)

(58) Field of Classification Search
None
See application file for complete search history.

(56) References Cited

U.S. PATENT DOCUMENTS 3,781,472 A      12/1973  Branscome et al.
2016/0113009 A1   4/2016  Seok
(Continued)

FOREIGN PATENT DOCUMENTS

CN    103947143 A    7/2014
CN    106576020 A    4/2017
(Continued)

OTHER PUBLICATIONS

Huang, Lei et al., Discussion on EHT PPDU Formats, Panasonic Corporation, IEEE 802.11-20/0031r2, Jan. 16, 2020, see slides 1-11.
(Continued)

*Primary Examiner* — Faruk Hamza
*Assistant Examiner* — Cassandra L Decker
(74) *Attorney, Agent, or Firm* — BRYAN CAVE LEIGHTON PAISNER LLP

(57) ABSTRACT

According to various embodiments, a reception STA may receive a physical layer protocol data unit (PPDU) including a first signal field, a second signal field, and a data field. The PPDU may be configured to be transmitted to a single user. The second signal field may consist of one content channel, and the one content channel may be duplicated in a first bandwidth in units of a second bandwidth.

12 Claims, 42 Drawing Sheets

(56) References Cited

U.S. PATENT DOCUMENTS

| | | | |
|---|---|---|---|
| 2019/0097850 | A1 | 3/2019 | Kenney et al. |
| 2020/0076552 | A1* | 3/2020 | Cherian ............... H04B 7/024 |
| 2020/0136884 | A1 | 4/2020 | Park et al. |
| 2020/0382998 | A1 | 12/2020 | Cao et al. |
| 2021/0045151 | A1 | 2/2021 | Chen et al. |
| 2021/0144752 | A1 | 5/2021 | Chen et al. |
| 2021/0185154 | A1 | 6/2021 | Schelstraete |
| 2021/0212035 | A1 | 7/2021 | Son et al. |
| 2021/0258115 | A1 | 8/2021 | Liu et al. |
| 2021/0273838 | A1 | 9/2021 | Park et al. |
| 2022/0053465 | A1* | 2/2022 | Redlich ............... H04L 5/0005 |
| 2022/0077979 | A1* | 3/2022 | Yu ..................... H04L 5/0053 |
| 2022/0182273 | A1 | 6/2022 | Huang et al. |
| 2022/0255681 | A1 | 8/2022 | Huang et al. |
| 2023/0016370 | A1 | 1/2023 | Kim et al. |
| 2023/0035527 | A1 | 2/2023 | Huang et al. |
| 2023/0337038 | A1 | 10/2023 | Chen et al. |

FOREIGN PATENT DOCUMENTS

| | | |
|---|---|---|
| CN | 107409035 A | 11/2017 |
| CN | 107925470 A | 4/2018 |
| CN | 110557843 A | 12/2019 |
| CN | 110730050 A | 1/2020 |
| JP | 2014515570 A | 6/2014 |
| JP | 2023511251 A | 3/2023 |
| KR | 10-2016-0045025 A | 4/2016 |
| WO | 2019204591 A1 | 10/2019 |

OTHER PUBLICATIONS

Cao, Rui et al., Discussions on U-SIG Content and EHT-SIG Format, NXP, IEEE 802.11-20/0087r0, Jan. 13, 2020, see slides 1-10.

Lim, Dongguk et al., Consideration for EHT-SIG transmission, LG Electronics, IEEE 802.11-20/0020r0, Jan. 12, 2020, see slides 1-17.

Lee, Wook Bong et al., SU PPDU SIG Contents Considerations, Samsung, IEEE 802.11-20/0285r1, Mar. 5, 2020, see slides 1-22.

Hu et al. "Preamble Structure and SIG Contents," IEEE 802.11-20/0029r1, Huawei Technologies, dated Jan. 2020, 22 pages.

Vermani et al. "PPDU Types and U-Sig Content," IEEE 802.11-20/0049r1, Qualcomm, Jan. 2020, 21 pages.

HTC, "UE radio access capability for WLAN," 3GPP TSG-RAN2#91bis, R2-154369, Oct. 2015, 7 pages.

China Mobile, "Addition of measurements realted to MAC-e feedback deconding," 3GPP TSG-SA5, S5-071545, Aug. 2007,3 pages.

Vermani et al., "PPDU Types and U-SIG Content", doc.: IEEE 802.11-20/0049r2, dated Jan. 13, 2020.

Lim et al., "11be PPDU format", doc,: IEEE 802.11-20/0019r1, dated Jan. 13, 2020.

Hu et al., "Preamble Structure and SIG Contents", doc.: IEEE 802.11-20/0029r3, dated Jan. 11, 2020.

Vermani et al. "U-SIG Structure and Preamble Processing," IEEE 802.11-20/0380r0, 10 pages, Mar. 2020.

Yu et al. "Preamble puncture indication for non-OFDMA transmission," IEEE 802.11-20/0401r0, 17 pages, Mar. 2020.

Wen-Yan et al. "MB-OFDM," Computer Engineering and Applications, 2010, 46(2), 4 pages.

Lim et al. "Further Discussion for 11be preamble," IEEE 802.11-19/1486r9, 20 pages, dated Nov. 2019.

* cited by examiner

FIG. 1
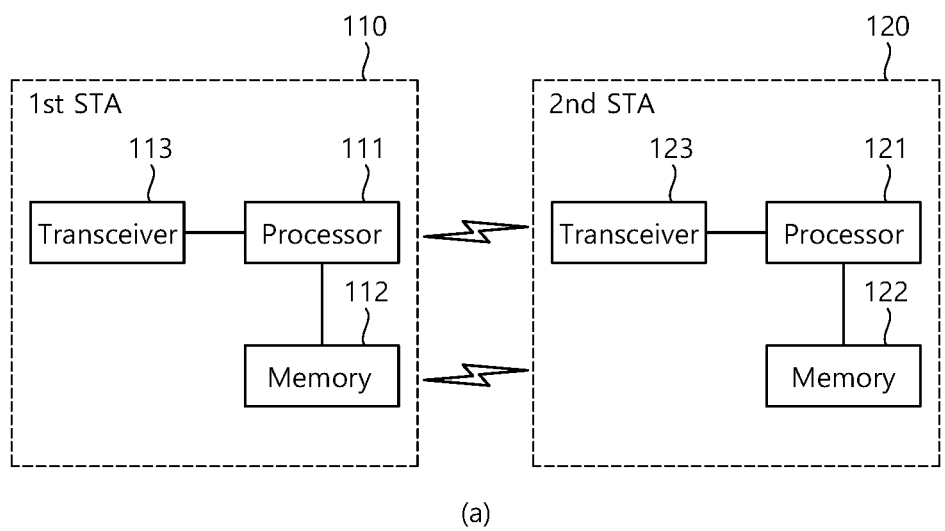
(a)
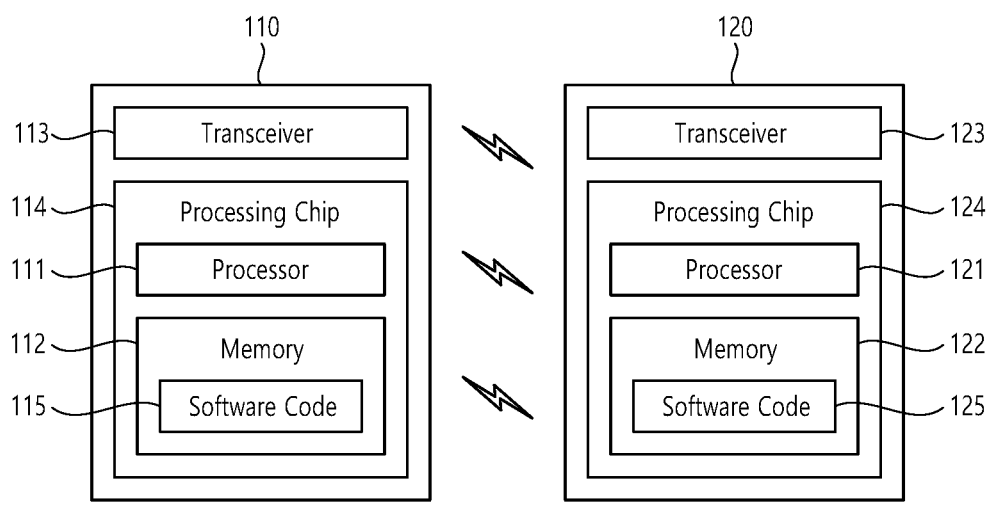
(b)

FIG. 2
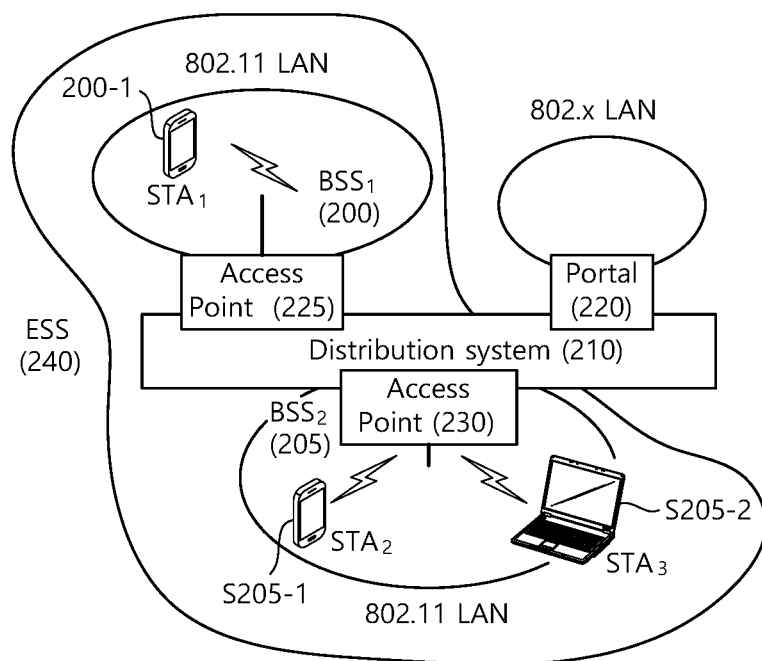
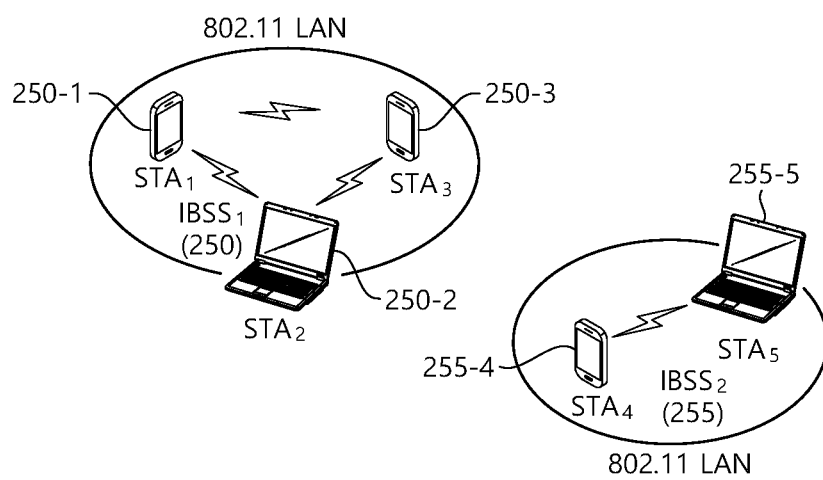

| Version independent field (2510) | Version dependent field (2520) |

FIG. 30

| | L-STF | L-LTF | L-SIG | RL-SIG | U-SIG | EHT-SIG1 |
|---|---|---|---|---|---|---|
| 80MHz | L-STF | L-LTF | L-SIG | RL-SIG | U-SIG | EHT-SIG2 |
| | L-STF | L-LTF | L-SIG | RL-SIG | U-SIG | EHT-SIG1 |
| | L-STF | L-LTF | L-SIG | RL-SIG | U-SIG | EHT-SIG2 |
| | L-STF | L-LTF | L-SIG | RL-SIG | U-SIG | EHT-SIG3 |
| 80MHz | L-STF | L-LTF | L-SIG | RL-SIG | U-SIG | EHT-SIG4 |
| | L-STF | L-LTF | L-SIG | RL-SIG | U-SIG | EHT-SIG3 |
| | L-STF | L-LTF | L-SIG | RL-SIG | U-SIG | EHT-SIG4 |
| | L-STF | L-LTF | L-SIG | RL-SIG | U-SIG | EHT-SIG5 |
| 80MHz | L-STF | L-LTF | L-SIG | RL-SIG | U-SIG | EHT-SIG6 |
| | L-STF | L-LTF | L-SIG | RL-SIG | U-SIG | EHT-SIG5 |
| | L-STF | L-LTF | L-SIG | RL-SIG | U-SIG | EHT-SIG6 |

| | L-STF | L-LTF | L-SIG | RL-SIG | U-SIG | EHT-SIG1 | |
|---|---|---|---|---|---|---|---|
| 80MHz | L-STF | L-LTF | L-SIG | RL-SIG | U-SIG | EHT-SIG2 | |
| | L-STF | L-LTF | L-SIG | RL-SIG | U-SIG | EHT-SIG1 | |
| | L-STF | L-LTF | L-SIG | RL-SIG | U-SIG | EHT-SIG2 | |
| | L-STF | L-LTF | L-SIG | RL-SIG | U-SIG | EHT-SIG3 | |
| 80MHz | L-STF | L-LTF | L-SIG | RL-SIG | U-SIG | EHT-SIG4 | |
| | L-STF | L-LTF | L-SIG | RL-SIG | U-SIG | EHT-SIG3 | ... |
| | L-STF | L-LTF | L-SIG | RL-SIG | U-SIG | EHT-SIG4 | |
| | L-STF | L-LTF | L-SIG | RL-SIG | U-SIG | EHT-SIG5 | |
| 80MHz | L-STF | L-LTF | L-SIG | RL-SIG | U-SIG | EHT-SIG6 | |
| | L-STF | L-LTF | L-SIG | RL-SIG | U-SIG | EHT-SIG5 | |
| | L-STF | L-LTF | L-SIG | RL-SIG | U-SIG | EHT-SIG6 | |
| | L-STF | L-LTF | L-SIG | RL-SIG | U-SIG | EHT-SIG7 | |
| 80MHz | L-STF | L-LTF | L-SIG | RL-SIG | U-SIG | EHT-SIG8 | |
| | L-STF | L-LTF | L-SIG | RL-SIG | U-SIG | EHT-SIG7 | |
| | L-STF | L-LTF | L-SIG | RL-SIG | U-SIG | EHT-SIG8 | |

FIG. 34

| | L-STF | L-LTF | L-SIG | RL-SIG | U-SIG | EHT-SIG1 | |
|---|---|---|---|---|---|---|---|
| 80MHz | L-STF | L-LTF | L-SIG | RL-SIG | U-SIG | EHT-SIG1 | ... |
| | L-STF | L-LTF | L-SIG | RL-SIG | U-SIG | EHT-SIG1 | |
| | L-STF | L-LTF | L-SIG | RL-SIG | U-SIG | EHT-SIG1 | |
| | L-STF | L-LTF | L-SIG | RL-SIG | U-SIG | EHT-SIG2 | |
| 80MHz | L-STF | L-LTF | L-SIG | RL-SIG | U-SIG | EHT-SIG2 | ... |
| | L-STF | L-LTF | L-SIG | RL-SIG | U-SIG | EHT-SIG2 | |
| | L-STF | L-LTF | L-SIG | RL-SIG | U-SIG | EHT-SIG2 | |
| | L-STF | L-LTF | L-SIG | RL-SIG | U-SIG | EHT-SIG3 | |
| 80MHz | L-STF | L-LTF | L-SIG | RL-SIG | U-SIG | EHT-SIG3 | ... |
| | L-STF | L-LTF | L-SIG | RL-SIG | U-SIG | EHT-SIG3 | |
| | L-STF | L-LTF | L-SIG | RL-SIG | U-SIG | EHT-SIG3 | |

FIG. 35

| | L-STF | L-LTF | L-SIG | RL-SIG | U-SIG | EHT-SIG1 | |
|---|---|---|---|---|---|---|---|
| 80MHz | L-STF | L-LTF | L-SIG | RL-SIG | U-SIG | EHT-SIG1 | ... |
| | L-STF | L-LTF | L-SIG | RL-SIG | U-SIG | EHT-SIG1 | |
| | L-STF | L-LTF | L-SIG | RL-SIG | U-SIG | EHT-SIG1 | |
| | L-STF | L-LTF | L-SIG | RL-SIG | U-SIG | EHT-SIG2 | |
| 80MHz | L-STF | L-LTF | L-SIG | RL-SIG | U-SIG | EHT-SIG2 | ... |
| | L-STF | L-LTF | L-SIG | RL-SIG | U-SIG | EHT-SIG2 | |
| | L-STF | L-LTF | L-SIG | RL-SIG | U-SIG | EHT-SIG2 | |
| | L-STF | L-LTF | L-SIG | RL-SIG | U-SIG | EHT-SIG3 | |
| 80MHz | L-STF | L-LTF | L-SIG | RL-SIG | U-SIG | EHT-SIG3 | ... |
| | L-STF | L-LTF | L-SIG | RL-SIG | U-SIG | EHT-SIG3 | |
| | L-STF | L-LTF | L-SIG | RL-SIG | U-SIG | EHT-SIG3 | |
| | L-STF | L-LTF | L-SIG | RL-SIG | U-SIG | EHT-SIG4 | |
| 80MHz | L-STF | L-LTF | L-SIG | RL-SIG | U-SIG | EHT-SIG4 | ... |
| | L-STF | L-LTF | L-SIG | RL-SIG | U-SIG | EHT-SIG4 | |
| | L-STF | L-LTF | L-SIG | RL-SIG | U-SIG | EHT-SIG4 | |

FIG. 36

| | L-STF | L-LTF | L-SIG | RL-SIG | U-SIG | EHT-SIG1 | |
|---|---|---|---|---|---|---|---|
| 80MHz | L-STF | L-LTF | L-SIG | RL-SIG | U-SIG | EHT-SIG1 | ... |
| | L-STF | L-LTF | L-SIG | RL-SIG | U-SIG | EHT-SIG1 | |
| | L-STF | L-LTF | L-SIG | RL-SIG | U-SIG | EHT-SIG1 | |
| | L-STF | L-LTF | L-SIG | RL-SIG | U-SIG | EHT-SIG1 | |
| 80MHz | L-STF | L-LTF | L-SIG | RL-SIG | U-SIG | EHT-SIG1 | ... |
| | L-STF | L-LTF | L-SIG | RL-SIG | U-SIG | EHT-SIG1 | |
| | L-STF | L-LTF | L-SIG | RL-SIG | U-SIG | EHT-SIG1 | |
| | L-STF | L-LTF | L-SIG | RL-SIG | U-SIG | EHT-SIG1 | |
| 80MHz | L-STF | L-LTF | L-SIG | RL-SIG | U-SIG | EHT-SIG1 | ... |
| | L-STF | L-LTF | L-SIG | RL-SIG | U-SIG | EHT-SIG1 | |
| | L-STF | L-LTF | L-SIG | RL-SIG | U-SIG | EHT-SIG1 | |
| | L-STF | L-LTF | L-SIG | RL-SIG | U-SIG | EHT-SIG1 | |
| 80MHz | L-STF | L-LTF | L-SIG | RL-SIG | U-SIG | EHT-SIG1 | ... |
| | L-STF | L-LTF | L-SIG | RL-SIG | U-SIG | EHT-SIG1 | |
| | L-STF | L-LTF | L-SIG | RL-SIG | U-SIG | EHT-SIG1 | |

FIG. 39

| | L-STF | L-LTF | L-SIG | RL-SIG | U-SIG | EHT-SIG1 | |
|---|---|---|---|---|---|---|---|
| | L-STF | L-LTF | L-SIG | RL-SIG | U-SIG | EHT-SIG2 | |
| 80MHz | L-STF | L-LTF | L-SIG | RL-SIG | U-SIG | EHT-SIG1 | |
| | L-STF | L-LTF | L-SIG | RL-SIG | U-SIG | EHT-SIG2 | |
| | L-STF | L-LTF | L-SIG | RL-SIG | U-SIG | EHT-SIG1 | |
| | L-STF | L-LTF | L-SIG | RL-SIG | U-SIG | EHT-SIG2 | |
| 80MHz | L-STF | L-LTF | L-SIG | RL-SIG | U-SIG | EHT-SIG1 | ... |
| | L-STF | L-LTF | L-SIG | RL-SIG | U-SIG | EHT-SIG2 | |
| | L-STF | L-LTF | L-SIG | RL-SIG | U-SIG | EHT-SIG3 | |
| | L-STF | L-LTF | L-SIG | RL-SIG | U-SIG | EHT-SIG4 | |
| 80MHz | L-STF | L-LTF | L-SIG | RL-SIG | U-SIG | EHT-SIG3 | |
| | L-STF | L-LTF | L-SIG | RL-SIG | U-SIG | EHT-SIG4 | |

FIG. 40

| | L-STF | L-LTF | L-SIG | RL-SIG | U-SIG | EHT-SIG1 | |
|---|---|---|---|---|---|---|---|
| 80MHz | L-STF | L-LTF | L-SIG | RL-SIG | U-SIG | EHT-SIG2 | |
| | L-STF | L-LTF | L-SIG | RL-SIG | U-SIG | EHT-SIG1 | |
| | L-STF | L-LTF | L-SIG | RL-SIG | U-SIG | EHT-SIG2 | |
| | L-STF | L-LTF | L-SIG | RL-SIG | U-SIG | EHT-SIG1 | |
| 80MHz | L-STF | L-LTF | L-SIG | RL-SIG | U-SIG | EHT-SIG2 | |
| | L-STF | L-LTF | L-SIG | RL-SIG | U-SIG | EHT-SIG1 | |
| | L-STF | L-LTF | L-SIG | RL-SIG | U-SIG | EHT-SIG2 | ... |
| | L-STF | L-LTF | L-SIG | RL-SIG | U-SIG | EHT-SIG3 | |
| 80MHz | L-STF | L-LTF | L-SIG | RL-SIG | U-SIG | EHT-SIG4 | |
| | L-STF | L-LTF | L-SIG | RL-SIG | U-SIG | EHT-SIG3 | |
| | L-STF | L-LTF | L-SIG | RL-SIG | U-SIG | EHT-SIG4 | |
| | L-STF | L-LTF | L-SIG | RL-SIG | U-SIG | EHT-SIG3 | |
| 80MHz | L-STF | L-LTF | L-SIG | RL-SIG | U-SIG | EHT-SIG4 | |
| | L-STF | L-LTF | L-SIG | RL-SIG | U-SIG | EHT-SIG3 | |
| | L-STF | L-LTF | L-SIG | RL-SIG | U-SIG | EHT-SIG4 | |

TECHNIQUE FOR CONFIGURING PREAMBLE IN WIRELESS COMMUNICATION SYSTEM

This application is the National Stage filing under 35 U.S.C. 371 of International Application No. PCT/KR2021/003103 filed on Mar. 12, 2021, which claims priority to Korean Patent Application Nos. 10-2020-0030985 filed on Mar. 12, 2020; 10-2020-0033445 filed on Mar. 18, 2020 and 10-2020-0033444 filed on Mar. 18, 2020, the contents of which are all hereby incorporated by reference herein in their entirety.

BACKGROUND

Technical Field

The present specification relates to a technique for configuring a preamble in a wireless LAN system and more particularly to a method for configuring a signal field in a preamble in a wireless LAN system and an apparatus supporting the same.

Related Art

Wireless network technologies may include various types of wireless local area networks (WLANs). The WLAN employs widely used networking protocols and can be used to interconnect nearby devices together. The various technical features described herein may be applied to any communication standard, such as WiFi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Solutions

In the EHT standard, a wide bandwidth (e.g., 160/320 MHz), 16 streams, and/or multi-link (or multi-band) operation may be used to support high throughput and high data rate.

In the EHT standard, a wide bandwidth (i.e., 160/240/320 MHz) may be used for high throughput. Also, in order to efficiently use bandwidth, preamble puncturing and multiple RU transmission may be used.

When transmitting an EHT PPDU using a wide bandwidth (i.e., 160/240/320 MHz), an EHT SIG transmission method and a BCC interleaver configuration for this in consideration of preamble puncturing/multiple RU allocation, etc. may be proposed.

According to various embodiments, a receiving station (STA) may perform operations comprising: receiving a Physical layer Protocol Data Unit (PPDU) including a first signal field, a second signal field, and a data field, wherein the PPDU is transmitted to a single user, wherein the PPDU is received based on a first bandwidth, wherein the second signal field is configured as one content channel, wherein the one content channel is configured by being duplicated in units of a second bandwidth within the first bandwidth; and decoding the PPDU based on the first signal field and the second signal field.

Technical Effects

According to various embodiments, preamble puncturing and multiple RUs may be used. Therefore, there is an effect that the bandwidth can be used efficiently.

According to various embodiments, the signal field (e.g., EHT-SIG) of the EHT PPDU may be transmitted with duplication in a specific bandwidth unit. Accordingly, there is an effect that the receiving STA can check information included in the signal field even if only a specific bandwidth is checked without checking the signal field of the entire bandwidth of the EHT PPDU.

According to an embodiment, an interleaver defined in a conventional standard may be reused. Accordingly, there is an effect that there is no need to change additional hardware.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 25 shows an example of the U-SIG.

FIG. 30 shows an example of EHT-SIG for 240 MHz.

FIG. 31 shows an example of EHT-SIG for 320 MHz.

FIG. 34 shows another example of EHT-SIG for 240 MHz.

FIG. 35 shows another example of EHT-SIG for 320 MHz.

FIG. 36 shows another example of EHT-SIG for 320 MHz.

FIG. 39 shows another example of EHT-SIG for 240 MHz.

FIG. 40 shows another example of EHT-SIG for 320 MHz.

DETAILED DESCRIPTION

Figure 3:
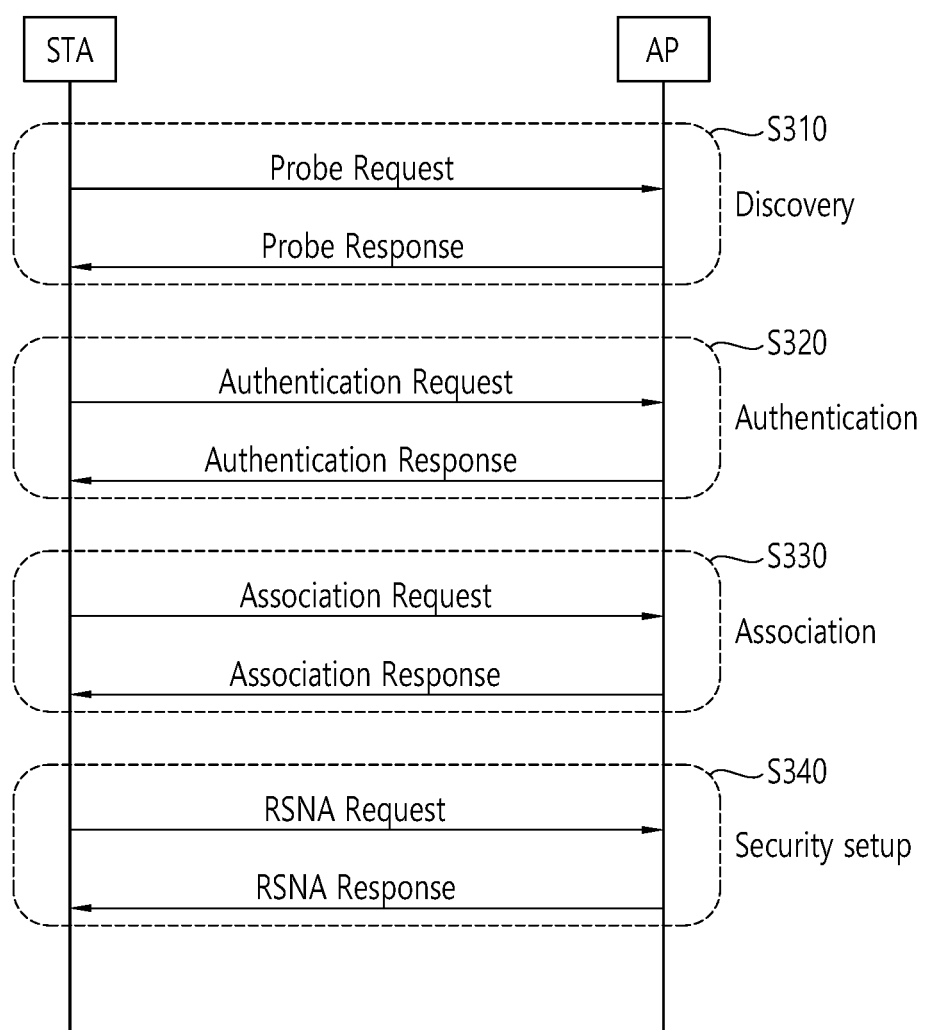
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
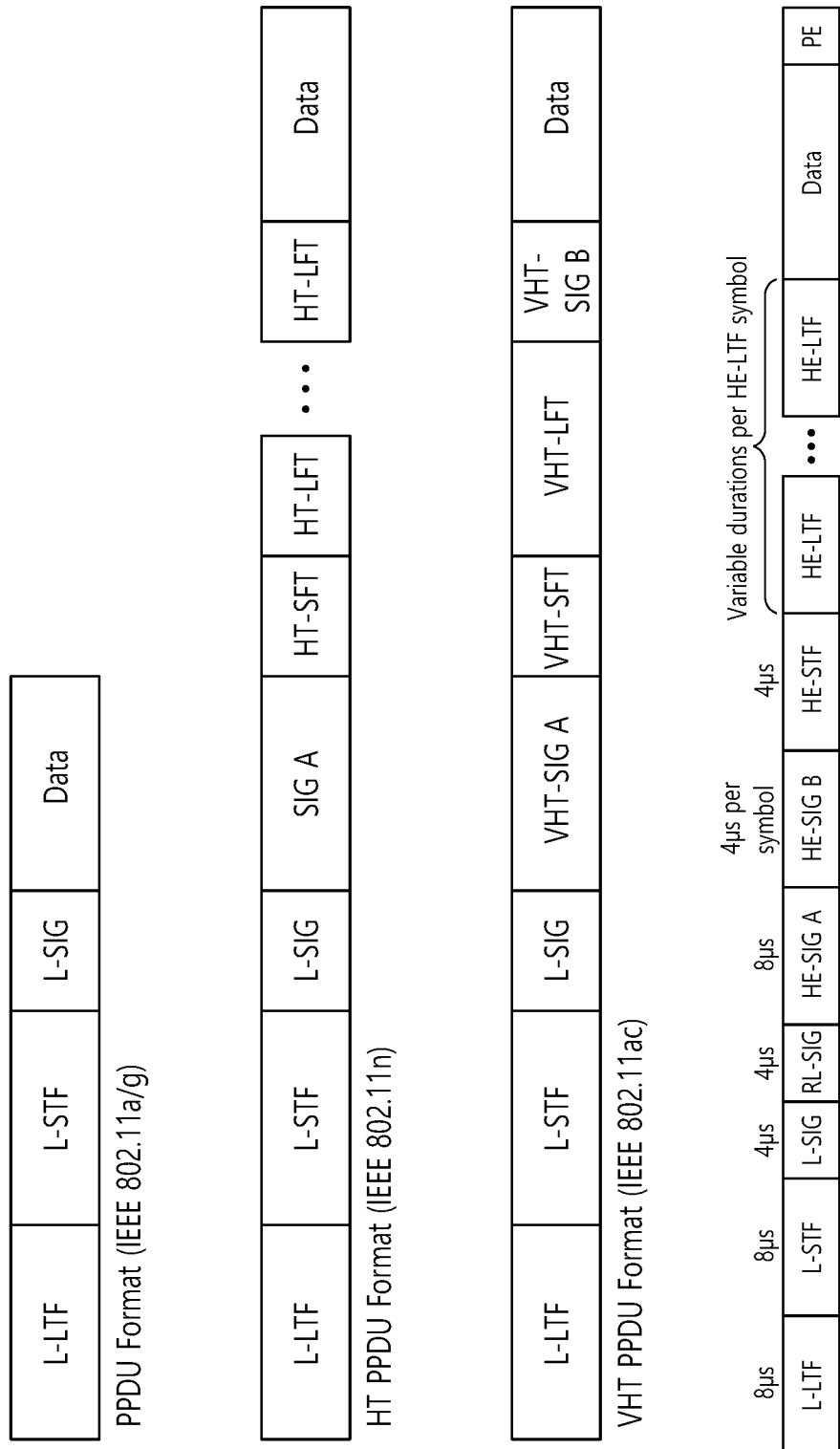
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
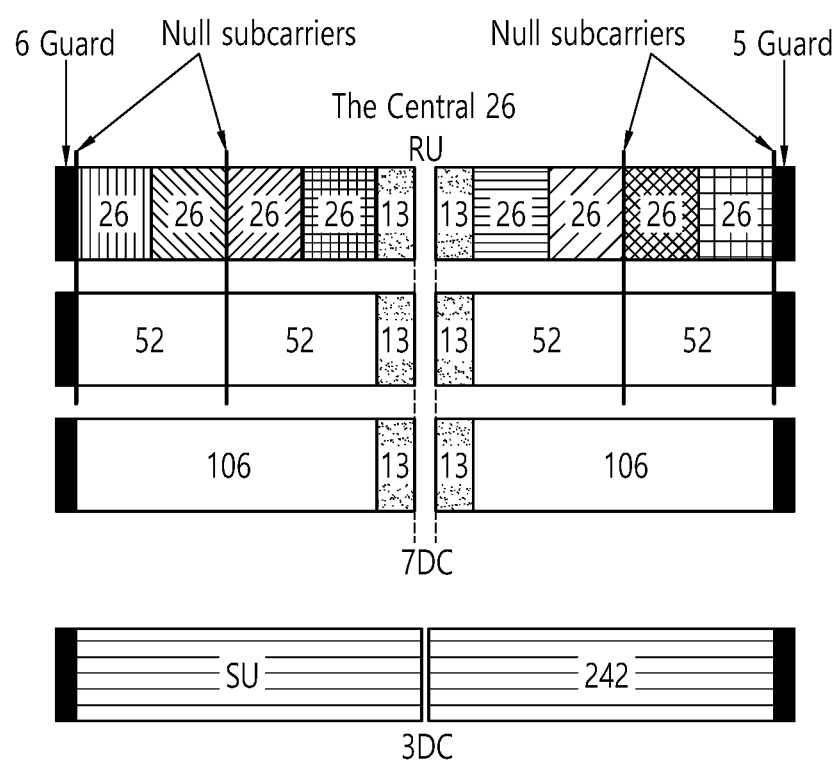
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
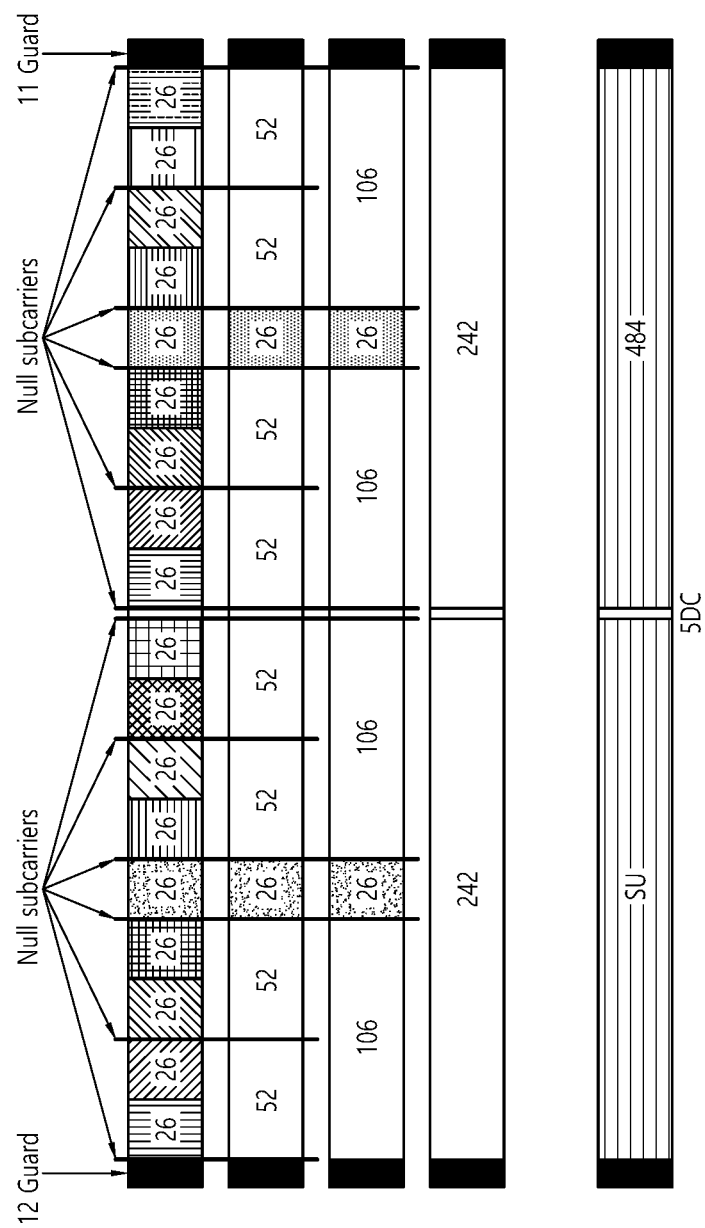
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40

MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
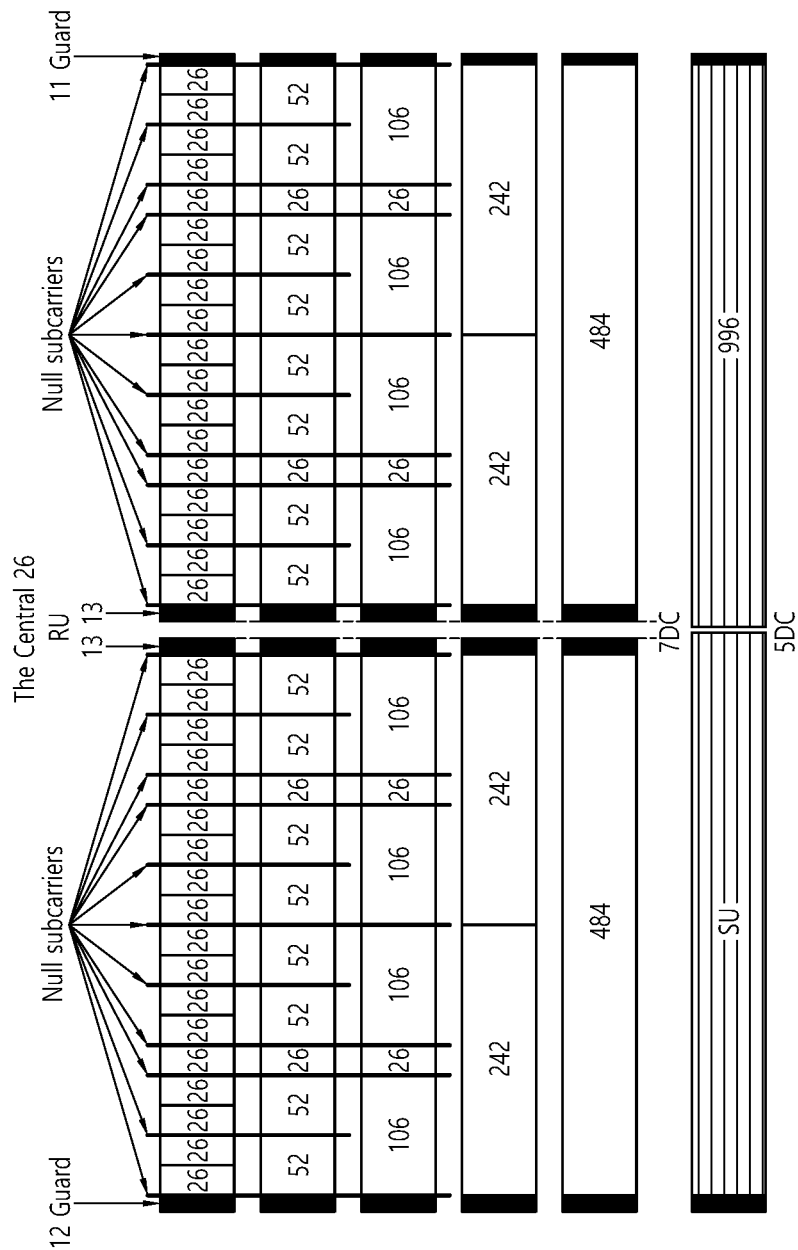
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
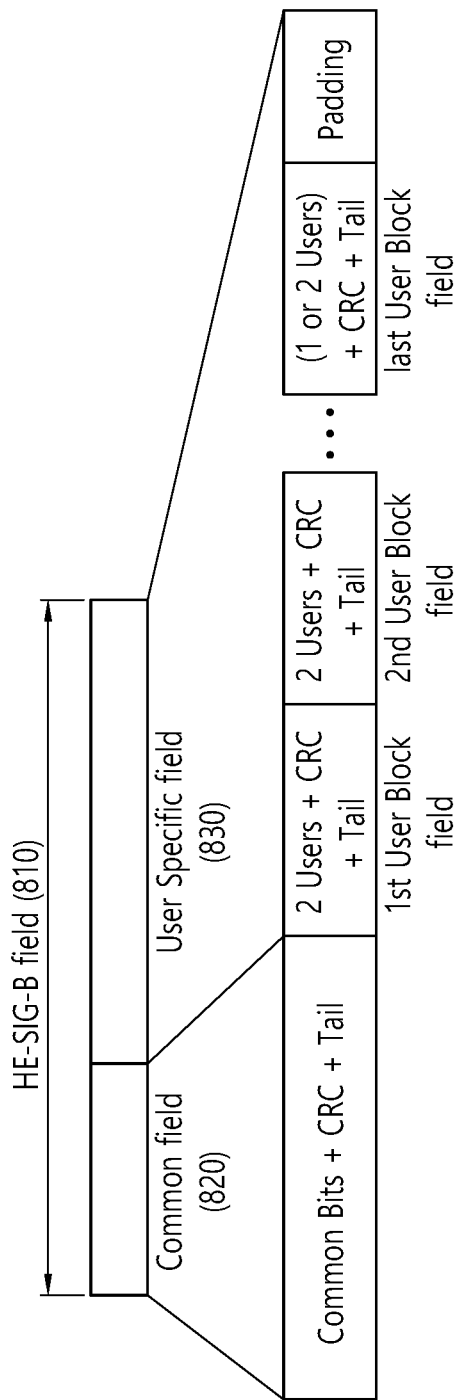
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000y$_2$y$_1$y$_0$ | | 106 | | | 26 | 26 | 26 | 26 | 26 | 8 |
| 01001y$_2$y$_1$y$_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
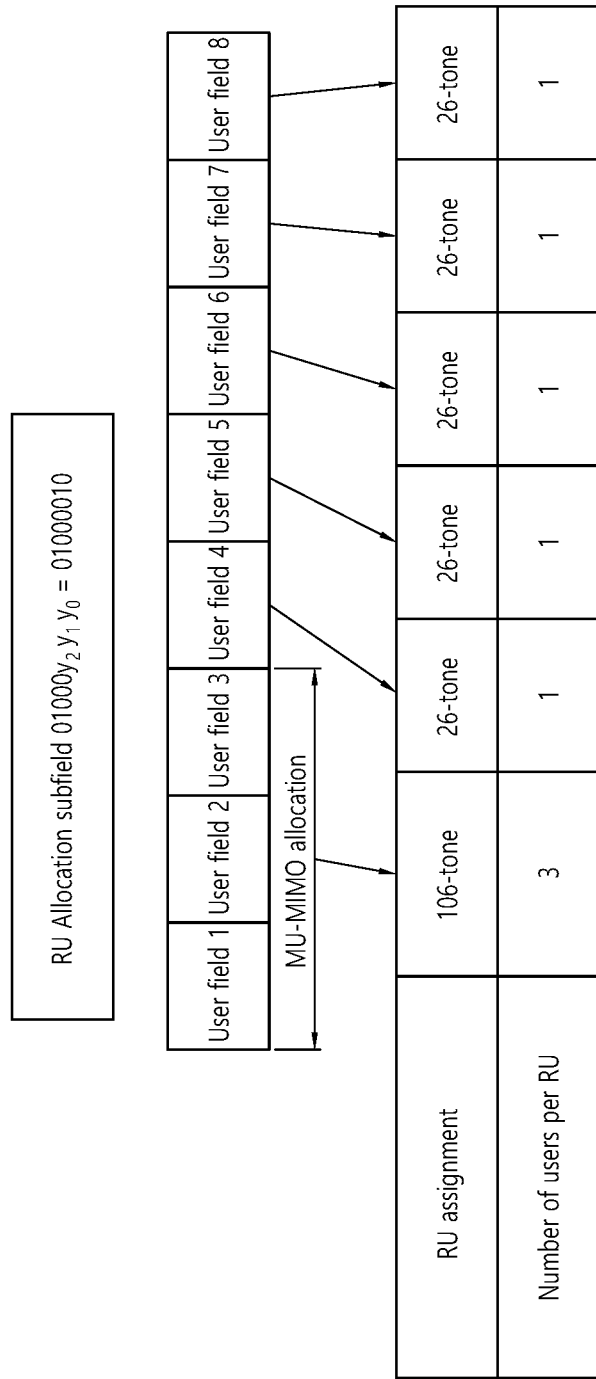
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
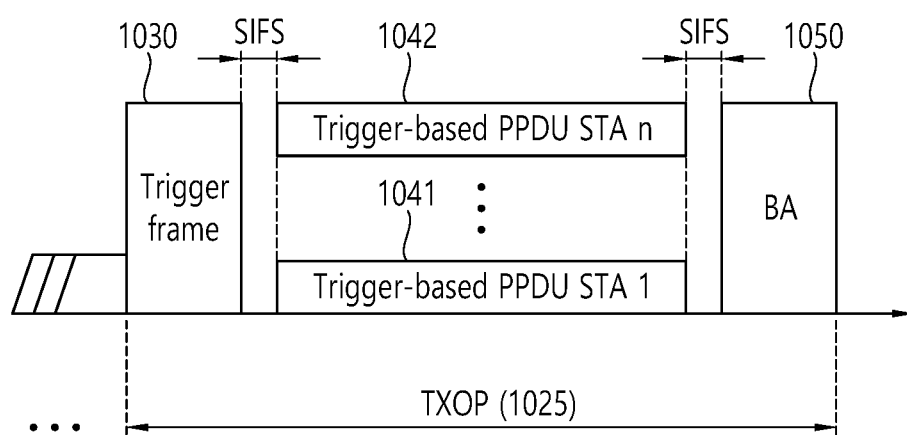
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
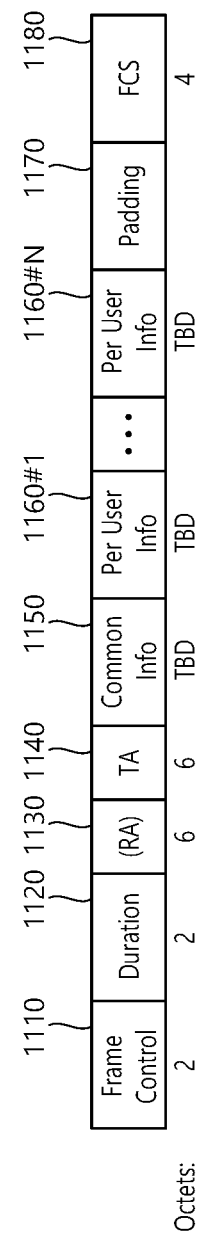
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
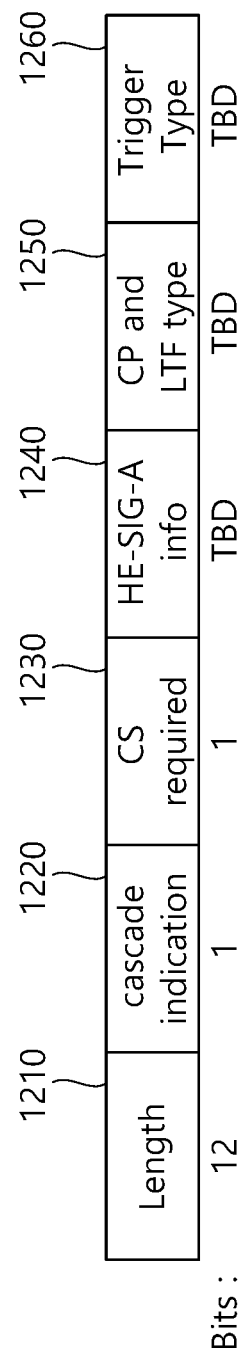
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
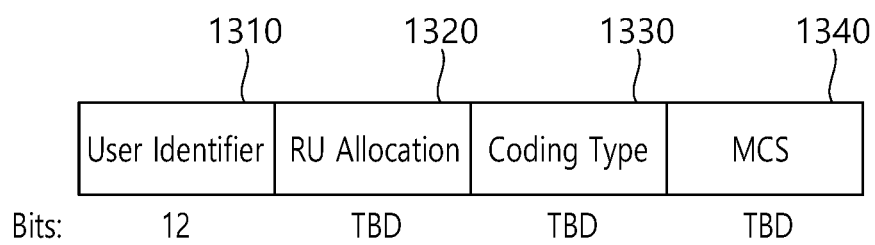
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL 01-DMA-based random access (UORA) scheme will be described.

Figure 14:
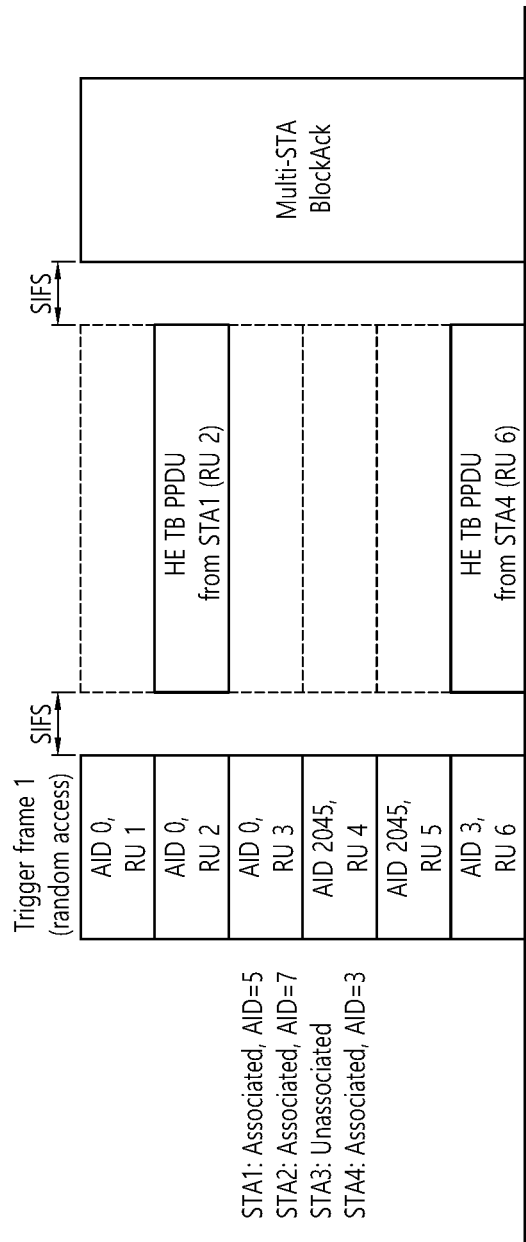
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
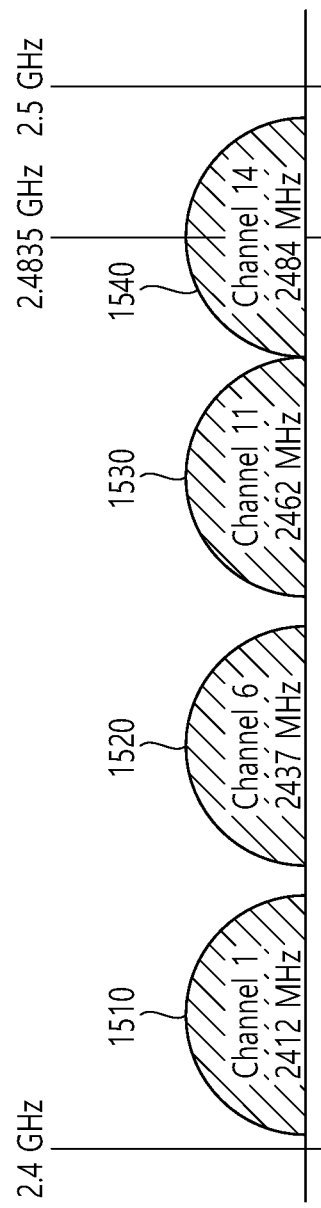
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
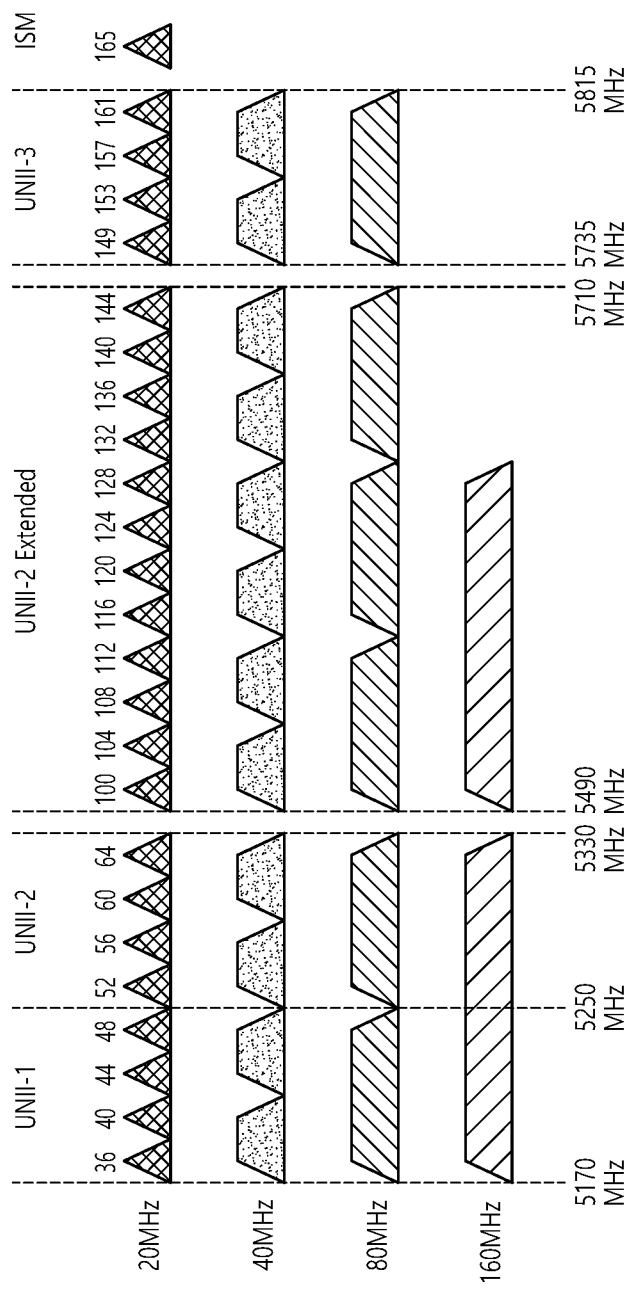
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
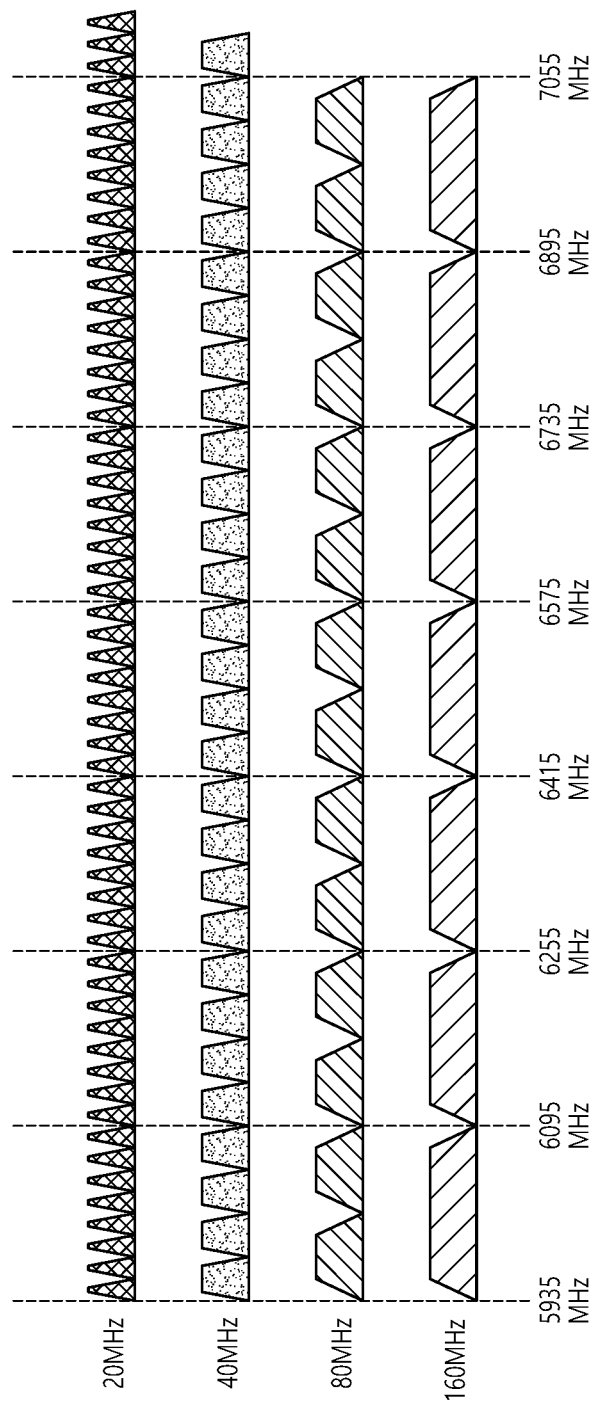
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (sub-carriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | 106 | | | | 1 |
| 17 | 26 | 26 | 52 | | 26 | 106 | | | | 1 |
| 18 | 52 | | 26 | 26 | 26 | 106 | | | | 1 |
| 19 | 52 | | 52 | | 26 | 106 | | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | 52 | | 1 |
| 22 | | 106 | | | 26 | 52 | | 26 | 26 | 1 |
| 23 | | 106 | | | 26 | 52 | | 52 | | 1 |
| 24 | 52 | | 52 | | — | 52 | | 52 | | 1 |
| 25 | 242-tone RU empty (with zero users) | | | | | | | | | 1 |
| 26 | | 106 | | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | 52 | | 26 | | 52 + 26 | | 26 | 1 |

TABLE 6-continued

| Indices | #1 | #2 | #3 | #4 | #5 | #6 | #7 | #8 | #9 | Number of entries |
|---------|----|----|----|----|----|----|----|----|----|-------------------|
| 64 | 26 | | 26 + 52 | | 26 | | 52 + 26 | | 26 | 1 |
| 65 | 26 | | 26 + 52 | | 26 | | 52 | | 52 | 1 |

TABLE 7

| 66 | 52 | | 26 | 26 | 26 | | 52 + 26 | | 26 | 1 |
|----|----|----|----|----|----|----|---------|----|----|---|
| 67 | 52 | | 52 | | 26 | | 52 + 26 | | 26 | 1 |
| 68 | 52 | | 52 + 26 | | | | 52 | | 52 | 1 |
| 69 | 26 | 26 | 26 | 26 | | | 26 + 106 | | | 1 |
| 70 | 26 | | 26 + 52 | | 26 | | | | 106 | 1 |
| 71 | 26 | 26 | 52 | | | | 26 + 106 | | | 1 |
| 72 | 26 | | 26 + 52 | | | | 26 + 106 | | | 1 |
| 73 | 52 | | 26 | 26 | | | 26 + 106 | | | 1 |
| 74 | 52 | | 52 | | | | 26 + 106 | | | 1 |
| 75 | | | 106 + 26 | | | 26 | 26 | 26 | 26 | 1 |
| 76 | | | 106 + 26 | | | 26 | 26 | | 52 | 1 |
| 77 | | | 106 + 26 | | | | 52 | 26 | 26 | 1 |
| 78 | | | 106 | | 26 | | 52 + 26 | | 26 | 1 |
| 79 | | | 106 + 26 | | | | 52 + 26 | | 26 | 1 |
| 80 | | | 106 + 26 | | | | 52 | | 52 | 1 |
| 81 | | | 106 + 26 | | | | | | 106 | 1 |
| 82 | | | 106 | | | | 26 + 106 | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands. The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M = \{-1,-1,-1,1,1,1,-1,1,1,1,-1,1,1,-1,1\} \quad <\text{Equation 1}>$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112:16:112) = \{M\}*(1+j)/\text{sqrt}(2)$$

$$\text{EHT-STF}(0) = 0 \quad <\text{Equation 2}>$$

The EHT-STF for the 40 MHz PPDU may be configured based on the following equation. The following example may be the first type (i.e., 1×STF) sequence.

$$\text{EHT-STF}(-240:16:240) = \{M,0,-M\}*(1+j)/\text{sqrt}(2) \quad <\text{Equation 3}>$$

The EHT-STF for the 80 MHz PPDU may be configured based on the following equation. The following example may be the first type (i.e., 1×STF) sequence.

$$\text{EHT-STF}(-496:16:496) = \{M,1,-M,0,-M,1,-M\}*(1+j)/\text{sqrt}(2) \quad <\text{Equation 4}>$$

The EHT-STF for the 160 MHz PPDU may be configured based on the following equation. The following example may be the first type (i.e., 1×STF) sequence.

$$\text{EHT-STF}(-1008:16:1008) = \{M,1,-M,0,-M,1,$$
$$-M,0,-M,-1,M,0,-M,1,-M\}*(1+j)/\text{sqrt}(2) \quad <\text{Equation 5}>$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496:16:496) = \{-M,-1,M,0,-M,1,-M\}*(1+j)/\text{sqrt}(2) \quad <\text{Equation 6}>$$

Equation 7 to Equation 11 below relate to an example of a second type (i.e., 2×STF) sequence.

$$\text{EHT-STF}(-120:8:120) = \{M,0,-M\}*(1+j)/\text{sqrt}(2) \quad <\text{Equation 7}>$$

The EHT-STF for the 40 MHz PPDU may be configured based on the following equation.

EHT-STF(−248:8:248)={M,−1,−M,0,M,−1,M}*(1+j)/sqrt(2)

EHT-STF(−248)=0

EHT-STF(248)=0   <Equation 8>

The EHT-STF for the 80 MHz PPDU may be configured based on the following equation.

EHT-STF(−504:8:504)={M,−1,M,−1,−M,−1,M,0,−M,1,M,1,−M,1,−M}*(1+j)/sqrt(2)   <Equation 9>

The EHT-STF for the 160 MHz PPDU may be configured based on the following equation.

EHT-STF(−1016:16:1016)={M,−1,M,−1,−M,−1,M,0,−M,1,M,1,−M,1,−M,0,−M,1,−M,1,M,1,−M,1,M,1,−M,0,−M,1,M,1,−M,1,−M}*(1+j)/sqrt(2)

EHT-STF(−8)=0,EHT-STF(8)=0,

EHT-STF(−1016)=0,EHT-STF(1016)=0   <Equation 10>

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

EHT-STF(−504:8:504)={−M,1,−M,1,M,1,−M,0,−M,1,M,1,−M,1,−M}*(1+j)/sqrt(2)

EHT-STF(−504)=0,

EHT-STF(504)=0   <Equation 11>

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
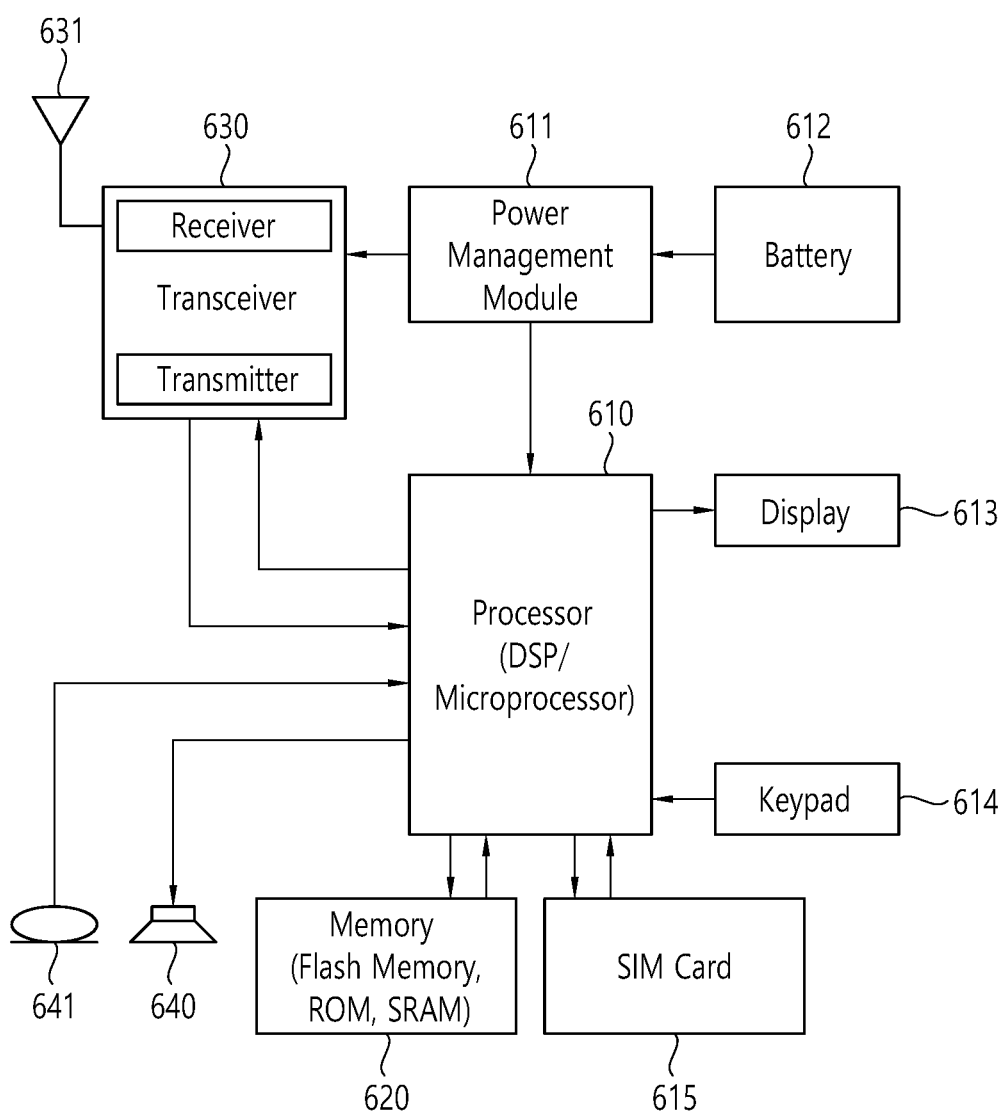
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
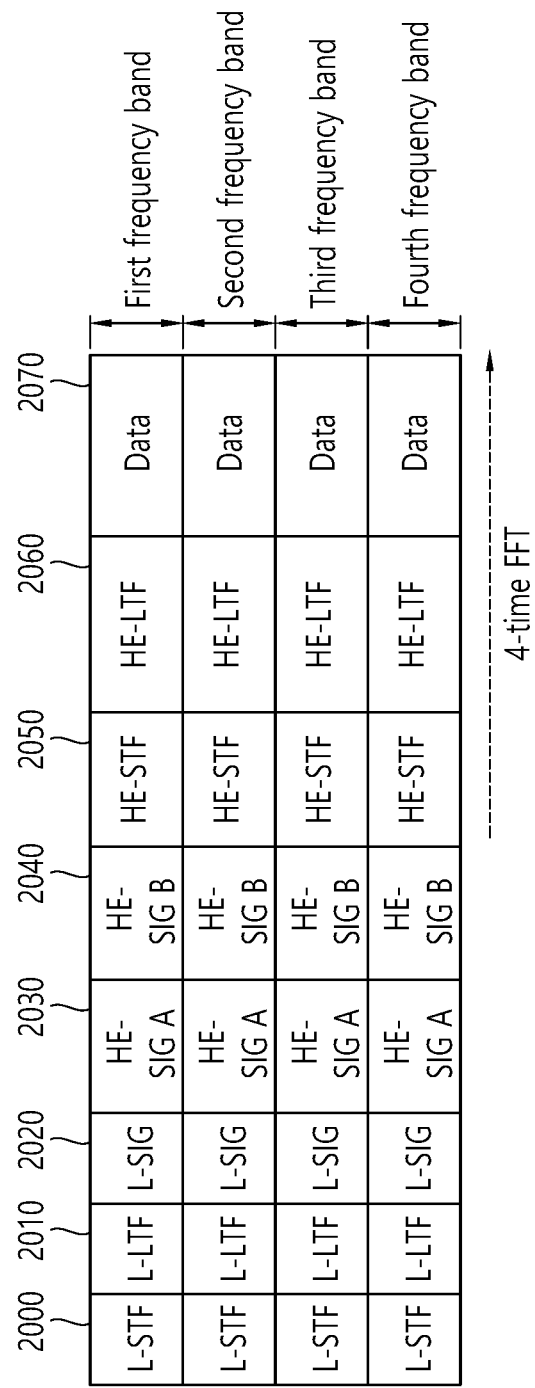
FIG. 20 shows an example of a HE-PPDU.

FIG. 20 shows an example of a HE-PPDU.

The illustrated L-STF 2000 may include a short training orthogonal frequency division multiplexing symbol (OFDM). The L-STF 2000 may be used for frame detection, automatic gain control (AGC), diversity detection, and coarse frequency/time synchronization.

The L-LTF 2010 may include a long training orthogonal frequency division multiplexing symbol (OFDM). The L-LTF 2010 may be used for fine frequency/time synchronization and channel estimation.

The L-SIG 2020 may be used to transmit control information. The L-SIG 2020 may include information related to a data transmission rate and a data length. Also, the L-SIG 2020 may be repeatedly transmitted. That is, the L-SIG 2020 may be configured in a repeated format (e.g., may be referred to as R-LSIG).

The HE-SIG-A 2030 may include control information common to the receiving station(s).

Specifically, the HE-SIG-A 2030 may include information related to: 1) a DL/UL indicator; 2) a BSS color field that is an identifier of the BSS; 3) a field indicating the remaining time of the current TXOP duration/period; 4) a Bandwidth field indicating whether 20, 40, 80, 160, 80+80 MHz; 5) a field indicating MCS scheme applied to the HE-SIG-B; 6) an indication field indicating whether modulation dual subcarrier modulation (DCM) is applied to the HE-SIG-B for MCS; 7) a field indicating the number of symbols used for HE-SIG-B; 8) a field indicating whether the HE-SIG-B is generated over the full/entire band; 9) a field indicating the number of symbols of the HE-LTF; 10) a field indicating a length of the HE-LTF and a CP length; 11) a field indicating whether additional OFDM symbols exist for LDPC coding; 12) a field indicating control information on Packet Extension (PE); and/or 13) a field indicating information related to a CRC field of the HE-SIG-A, and the like. At least one field of the HE-SIG-A may be omitted or changed. In addition, some fields may be added or omitted in other environments where the HE-SIG-A is not a multi-user (MU) environment.

Also, the HE-SIG-A 2030 may be composed of two parts: HE-SIG-A1 and HE-SIG-A2. The HE-SIG-A1 and HE-SIG-A2 included in the HE-SIG-A may be defined in the following format structure (field) according to a corresponding PPDU. First, the HE-SIG-A field of the HE SU PPDU may be defined as follows.

TABLE 8

| Two Parts of HE-SIG-A | Bit | Field | Number of bits | Description |
| --- | --- | --- | --- | --- |
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |

TABLE 9

| Two Parts of HE-SIG-A | Bit | Field | Number of bits | Description |
|---|---|---|---|---|
| | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if both the DCM and STBC are set to 1.<br>Set to 0 to indicate that DCM is not applied to the Data field.<br>NOTE-DCM is applied only to HE-MCSs 0, 1, 3 and 4. DCM is applied only to 1 and 2 spatial streams. DCM is not applied in combination with STBC |
| | B8-B13 | BSS Color | 6 | The BSS Color field is an identifier of the BSS.<br>Set to the value of the TXVECTOR parameter BSS_-COLOR. |
| | B14 | Reserved | 1 | Reserved and set to 1 |
| | B15-B18 | Spatial Reuse | 4 | Indicates whether or not spatial reuse is allowed during the transmission of this PPDU<br>Set to a value from Table 28-21 (Spatial Reuse field encoding for an HE SU PPDU, HE ER SU PPDU, and HE MU PPDU), see 27.11.6 (SPATIAL_REUSE).<br>Set to SRP_DISALLOW to prohibit SRP-based spatial reuse during this PPDU.<br>Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |

TABLE 10

| Two Parts of HE-SIG-A | Bit | Field | Number of bits | Description |
|---|---|---|---|---|
| | B21-B22 | GI + LTF Size | 2 | Indicates the GI duration and HE-LTF size.<br>Set to 0 to indicate a 1x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate:<br>a 4x HE-LTF and 0.8 μs GI if both the DCM and STBC fields are 1. Neither DCM nor STBC shall be applied if both the DCM and STBC fields are set to 1.<br>a 4x HE-LTF and 3.2 μs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |

TABLE 10-continued

| Two Parts of HE-SIG-A | Bit | Field | Number of bits | Description |
|---|---|---|---|---|
| HE-SIG-A2 (HE SU PPDU) or HE-SIG-A3 (HE ER SU PPDU) | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8). Otherwise, B0 is set to 1 and B1-B6 is set to floor ((TXOP_DURATION − 512)/128) where B0 indicates the TXOP length granularity. Set to 0 for 8 μs; otherwise set to 1 for 128 μs. B1-B6 indicates the scaled value of the TXOP_DURATION |
| | B7 | Coding | 1 | Indicates whether BCC or LDPC is used: Set to 0 to indicate BCC Set to 1 to indicate LDPC |

TABLE 11

| Two Parts of HE-SIG-A | Bit | Field | Number of bits | Description |
|---|---|---|---|---|
| | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present Reserved and set to 1 if the Coding field is set to 0 |
| | B9 | STBC | 1 | If the DCM field is set to 0, then set to 1 if space time block coding is used. Neither DCM nor STBC shall be applied if both the DCM field and STBC field are set to 1. Set to 0 otherwise. |
| | B10 | Beam-formed | 1 | Set to 1 if a beamforming steering matrix is applied to the waveform in an SU transmission. Set to 0 otherwise. |
| | B11-B12 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B13 | PE Disambiguity | 1 | Indicates PE disambiguity as defined in 28.3.12 (Packet extension). |
| | B14 | Reserved | 1 | Reserved and set to 1 |
| | B15 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (sec 28.3.11.16 Midamble), the midamble is not present, but the channel is fast varying. It recommends that midamble may be used for the PPDUs of the reverse link. Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE MU PPDU may be defined as follows.

TABLE 12

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG.<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_-COLOR. |
| | B11-B14 | Spatial Reuse | 4 | Indicates whether or not spatial reuse is allowed during the transmission of this PPDU<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 13

| Two Parts of HE-SIG-A | Bit | Field | Number of bits | Description |
|---|---|---|---|---|
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz sub-channels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |

TABLE 13-continued

| Two Parts of HE-SIG-A | Bit | Field | Number of bits | Description |
|---|---|---|---|---|
| | B18-B21 | Number Of HE-SIG-B Symbols Or MU-MIMO Users | 4 | If the HE-SIG-B Compression field is set to 0, indicates the number of OFDM symbols in the HE-SIG-B field: Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1 |
| | B22 | SIGB Compression | 1 | Set to 0 if the Common field in HE-SIG-B is present. Set to 1 if the Common field in HE-SIG-B is not present. |

TABLE 14

| Two Parts of HE-SIG-A | Bit | Field | Number of bits | Description |
|---|---|---|---|---|
| | B23-B24 | GI + LTF Size | 2 | Indicates the GI duration and HE-LTF size: Set to 0 to indicate a 4x HE-LTF and 0.8 μs GI Set to 1 to indicate a 2x HE-LTF and 0.8 μs GI Set to 2 to indicate a 2x HE-LTF and 1.6 μs GI Set to 3 to indicate a 4x HE-LTF and 3.2 μs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8) Otherwise, B0 is set to 1 and B1-B6 is set to floor((TXOP_DURATION − 512)/128) where B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |

TABLE 15

| Two Parts of HE-SIG-A | Bit | Field | Number of bits | Description |
|---|---|---|---|---|
| | B8-B10 | Number of HE-LTF Symbols And Midamble Periodicity | 3 | If the Doppler field is set to 0, indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1 B8-B9 indicates the number of HE-LTF symbols and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation. |
| | B13-B14 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B15 | PE Disambiguity | 1 | Indicates PE disambiguity as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 16

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_-COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). |

TABLE 16-continued

| Two Parts of HE-SIG-A | Bit | Field | Number of bits | Description |
|---|---|---|---|---|
| | | | | Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 17

| Two Parts of HE-SIG-A | Bit | Field | Number of bits | Description |
|---|---|---|---|---|
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz:<br>This Spatial Reuse field applies to the second 20 MHz subband.<br>If the STA operating channel width is 20 MHz, then this field is set to the same value as Spatial Reuse 1 field.<br>If the STA operating channel width is 40 MHz in the 2.4 GHz band, this field is set to the same value as Spatial Reuse 1 field.<br>If the Bandwidth field indicates 160/80 + 80 MHz the this Spatial Reuse field applies to the second 40 MHz subband of the 160 MHz operating band.<br>Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROIHBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

45

TABLE 18

| Two Parts of HE-SIG-A | Bit | Field | Number of bits | Description |
|---|---|---|---|---|
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the third 20 MHz subband.<br>If the STA operating channel width is 20 MHz or 40 MHz, this field is set to the same value as Spatial Reuse 1 field.<br>If the Bandwidth field indicates 160/80 + 80 MHz:<br>This Spatial Reuse field applies to the third 40 MHz subband of the 160 MHz operating band.<br>If the STA operating channel width is 80 + 80 MHz, this field is set to the same value as Spatial Reuse 1 field. |

TABLE 18-continued

| Two Parts of HE-SIG-A | Bit | Field | Number of bits | Description |
|---|---|---|---|---|
| | | | | Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 19

| Two Parts of HE-SIG-A | Bit | Field | Number of bits | Description |
|---|---|---|---|---|
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If the STA operating channel width is 20 MHz, then this field is set to the same value as Spatial Reuse 1 field. If the STA operating channel width is 40 MHz, then this field is set to the same value as Spatial Reuse 2 field. If the Bandwidth field indicates 160/80 + 80 MHz: This Spatial Reuse field applies to the fourth 40 MHz subband of the 160 MHz operating band. If the STA operating channel width is 80 + 80 MHz, then this field is set to same value as Spatial Reuse 2 field. Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |
| | B24-B25 | Bandwidth | 2 | Set to 0 for 20 MHz Set to 1 for 40 MHz Set to 2 for 80 MHz Set to 3 for 160 MHz and 80 + 80 MHz |

TABLE 20

| Two Parts of HE-SIG-A | Bit | Field | Number of bits | Description |
|---|---|---|---|---|
| HE-SIG-A2 | B0-B6 | TXOP | 7 | Set to 127 to indicate no duration information if TXVECTOR parameter TXOP_DURATION is set to UNSPECIFIED. |

TABLE 20-continued

| Two Parts of HE-SIG-A | Bit | Field | Number of bits | Description |
|---|---|---|---|---|
| | | | | Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8) Otherwise, B0 is set to 1 and B1-B6 is set to floor ((TXOP_DURATION − 512)/128) where B0 indicates the TXOP length granularity. Set to 0 for 8 µs; otherwise set to 1 for 128 µs. B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

The HE-SIG-B 2040 may be included only for a multiple-user (MU) PPDU as described above. Basically, the HE-SIG-A 2050 or the HE-SIG-B 2060 may include resource allocation information (or virtual resource allocation information) for at least one receiving STA.

Hereinafter, technical features applicable to the EHT standard will be described.

According to an embodiment of the present specification, the EHT standard may support PPDUs of 320 MHz bandwidth and 160+160 MHz. In addition, 240 MHz transmission and 160+80 MHz transmission may be supported. The 240 MHz transmission and 160+80 MHz transmission may be configured by applying 80 MHz preamble puncturing in 320 MHz bandwidth and 160+160 MHz bandwidth, respectively. For example, the 240 MHz bandwidth and 160+80 MHz bandwidth may be configured based on three 80 MHz channels including a primary 80 MHz (channel).

According to an embodiment of the present specification, the EHT standard may re-use a tone plan of the IEEE 802.11ax standard a 20/40/80/160/80+80 MHz PPDU. According to an embodiment, a 160 MHz OFDMA tone plan of the IEEE 802.11ax standard may be duplicated and used for 320 MHz and 160+160 MHz PPDUs.

According to an embodiment of the present specification, the transmission in 240 MHz and 160+80 MHz may consist of three 80 MHz segments. For example, the tone plan of each 80 MHz segment may be configured in the same manner as the 80 MHz tone plan of the IEEE 802.11ax standard.

According to an embodiment of the present specification, a 160 MHz tone plan may be duplicated and used for a non-OFDMA tone plan of a 320/160+160 MHz PPDU.

According to an embodiment of the present specification, a duplicated HE160 tone plan may be used for a 320/160+160 MHz PPDU non-OFDMA tone plan.

According to an embodiment of the present specification, in each 160 MHz segment for a non-OFDMA tone plan of a 320/160+160 MHz PPDU, 12 and 11 null tones may be configured on the leftmost side and the rightmost side, respectively.

According to an embodiment of the present specification, the data part of the EHT PPDU may use the same subcarrier spacing as the data part of the IEEE 802.11ax standard.

Hereinafter, technical features of a resource unit (RU) applicable to the EHT standard will be described.

According to an embodiment of the present specification, in the EHT standard, one or more RUs may be allocated to a single STA. For example, coding and interleaving schemes for multiple RUs allocated to a single STA may be variously set.

According to an embodiment of the present specification, small-size RUs may be aggregated with other small-size RUs. According to an embodiment of the present specification, large-size RUs may be aggregated with other large-size RUs.

For example, RUs of 242 tones or more may be defined/set as 'large size RUs'. For another example, RUs of less than 242 tones may be defined/configured as 'small size RUs'.

According to an embodiment of the present specification, there may be one PSDU per STA for each link. According to an embodiment of the present specification, for LDPC encoding, one encoder may be used for each PSDU.

Small-Size RUs

According to an embodiment of the present specification, an aggregation of small-size RUs may be set so as not to cross a 20 MHz channel boundary. For example, RU106+RU26 and RU52+RU26 may be configured as an aggregation of small-size RUs.

According to an embodiment of the present specification, in PPDUs of 20 MHz and 40 MHz, contiguous RU26 and RU106 may be aggregated/combined within a 20 MHz boundary.

According to an embodiment of the present specification, in PPDUs of 20 MHz and 40 MHz, RU26 and RU52 may be aggregated/combined.

Figure 21:
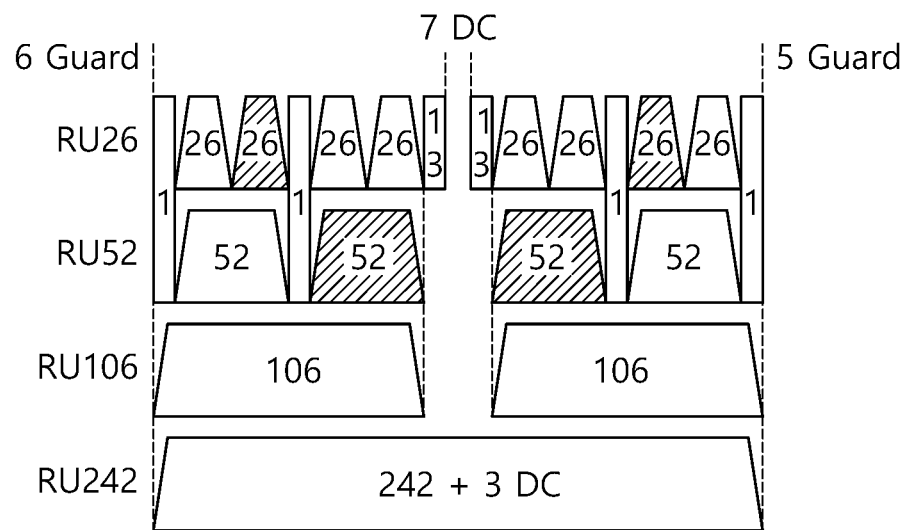
FIG. 21 shows an example of an aggregation of RU26 and RU52 in 20 MHz.

For example, in 20 MHz (or 20 MHz PPDU), an example of contiguous RU26 and RU52 may be shown through FIG. 21.

FIG. 21 shows an example of an aggregation of RU26 and RU52 in 20 MHz.

Referring to FIG. 21, shaded RU26 and RU52 may be aggregated. For example, the second RU26 and the second RU52 may be aggregated. For another example, the seventh RU and the third RU52 may be aggregated.

Figure 22:
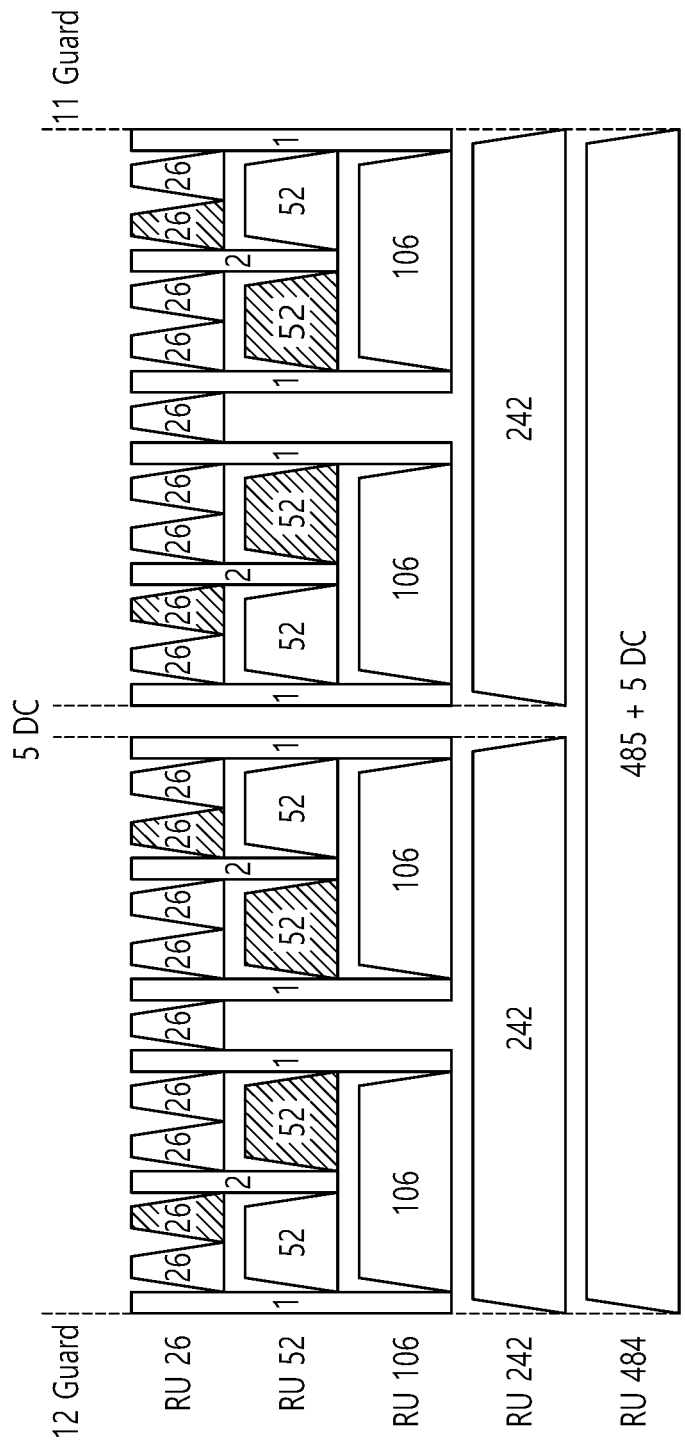
FIG. 22 shows an example of an aggregation of RU26 and RU52 in 40 MHz.

For example, in 40 MHz, an example of contiguous RU26 and RU52 is described in FIG. 22.

FIG. 22 shows an example of an aggregation of RU26 and RU52 in 40 MHz.

Referring to FIG. 22, shaded RU26 and RU52 may be aggregated. For example, the second RU26 and the second RU52 may be aggregated. For another example, the eighth RU26 and the third RU52 may be aggregated. For another example, the eleventh RU26 and the sixth RU52 may be aggregated. For another example, the seventeenth RU26 and the seventh RU52 may be aggregated.

According to an embodiment of the present specification, RU26 and RU52 may be aggregated/combined in a PPDU of 80 MHz.

Figure 23:
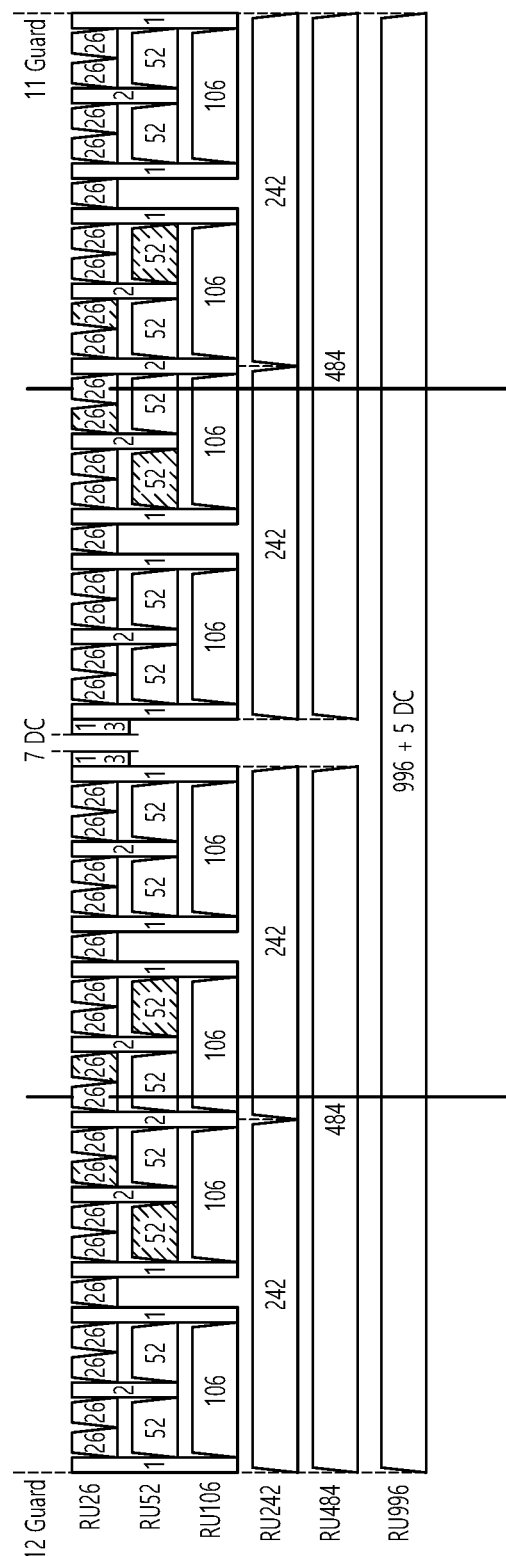
FIG. 23 shows an example of an aggregation of RU26 and RU52 in 80 MHz.

For example, an example of contiguous RU26 and RU52 in 80 MHz may be shown by FIG. 23.

FIG. 23 shows an example of an aggregation of RU26 and RU52 in 80 MHz.

Referring to FIG. 23, 80 MHz may be divided into the first 40 MHz and the second 40 MHz. For example, within the first 40 MHz, the 8th RU26 and the 3rd RU52 may be aggregated. For another example, within the first 40 MHz, the 11th RU26 and the 6th RU52 may be aggregated. For another example, within the second 40 MHz, the 8th RU26 and the 3rd RU52 may be aggregated. For another example, within the second 40 MHz, the 11th RU26 and the 6th RU52 may be aggregated.

According to an embodiment, when LDPC coding is applied, a single tone mapper may be used for RUs having less than 242 tones.

Large-Size RUs

According to an embodiment, in OFDMA transmission of 320/160+160 MHz for a single STA, an aggregation of a large-size RUs may be allowed only within a primary 160 MHz or a secondary 160 MHz. For example, the primary 160 MHz (channel) may consist of a primary 80 MHz (channel) and a secondary 80 MHz (channel). The secondary 160 MHz (channel) can be configured with channels other than the primary 160 MHz.

According to an embodiment, in OFDMA transmission of 240 MHz for a single STA, an aggregated of large-size RUs may be allowed only within 160 MHz (band/channel), and the 160 MHz may consist of two adjacent 80 MHz channels.

According to an embodiment, in OFDMA transmission of 160+80 MHz for a single STA, an aggregation of large-size RUs may be allowed only within a continuous 160 MHz (band/channel) or within the remaining 80 MHz (band/channel).

In 160 MHz OFDMA, an aggregation of large-size RUs configured as shown in Table 21 may be supported.

TABLE 21

| RU size | Aggregate BW | Notes |
| --- | --- | --- |
| 484 + 996 | 120 MHz | 4 options |

In 80 MHz OFDMA, an aggregation of large-size RUs configured as shown in Table 9 may be supported.

TABLE 22

| RU size | Aggregate BW | Notes |
| --- | --- | --- |
| 484 + 242 | 60 MHz | 4 options |

In 80 MHz non-OFDMA, an aggregation of large-size RUs configured as shown in Table 23 may be supported. In 80 MHz non-OFDMA, puncturing can be applied. For example, one of four 242 RUs may be punctured.

TABLE 23

| RU size | Aggregate BW | Notes |
| --- | --- | --- |
| 484 + 242 | 60 MHz | 4 options |

In 160 MHz non-OFDMA, an aggregation of large-size RUs configured as shown in Table 24 may be supported. In 160 MHz non-OFDMA, puncturing can be applied. For example, one of eight 242 RUs may be punctured. For another example, one of four 484 RUs may be punctured.

TABLE 24

| 80 MHz RU Size | 80 MHz RU size | Aggregate BW | Notes |
| --- | --- | --- | --- |
| 484 | 996 | 120 MHz | 4 options |
| 484 + 242 | 996 | 140 MHz | 8 options |

In 240 MHz non-OFDMA, an aggregation of large-size RUs configured as shown in Table 25 may be supported. In 240 MHz non-OFDMA, puncturing can be applied. For example, one of six 484 RUs may be punctured. For another example, one of three 996 RUs may be punctured.

TABLE 25

| 80 MHz RU size | 80 MHz RU size | 80 MHz RU size | Aggregate BW | Notes |
| --- | --- | --- | --- | --- |
| 484 | 996 | 996 | 200 MHz | 6 options |
| — | 996 | 996 | 160 MHz | 3 options |

In 320 MHz non-OFDMA, an aggregation of large-size RUs configured as shown in Table 26 may be supported. In 320 MHz non-OFDMA, puncturing can be applied. For example, one of eight 484 RUs may be punctured. For another example, one of four 996 RUs may be punctured.

TABLE 26

| 80 MHz RU size | 80 MHz RU size | 80 MHz RU size | 80 MHz RU size | Aggregate BW | Notes |
| --- | --- | --- | --- | --- | --- |
| 484 | 996 | 996 | 996 | 280 MHz | 8 options |
| — | 996 | 996 | 996 | 240 MHz | 4 options |

Hereinafter, technical features related to the operating mode will be described.

According to an embodiment, a station (STA) supporting the EHT standard STA (hereinafter, "EHT STA") or a station (STA) supporting the EHT standard STA (hereinafter, "HE STA") may operate in a 20 MHz channel width mode. In the 20 MHz channel width mode, the EHT STA may operate by reducing the operating channel width to 20 MHz using an operating mode indication (OMI).

According to an embodiment, the EHT STA (or HE STA) may operate in a 20 MHz channel width mode. For example, in the 20 MHz channel width mode, the EHT STA may operate by reducing the operating channel width to 20 MHz using an operating mode indication (OMI).

According to an embodiment, the EHT STA may support sub-channel selective transmission (SST). A station (STA)

supporting the SST can quickly select (and switch to) another channel between transmissions to cope with fading in a narrow sub-channel.

The 802.11be standard (i.e., the EHT standard) can provide a higher data rate than the 802.11ax standard. The EHT (i.e., extreme high throughput) standard can support wide bandwidth (up to 320 MHz), 16 streams, and multi-band operation.

In addition, in the EHT standard, various preamble puncturing or multiple RU allocation may be supported in wide bandwidth (up to 320 MHz) and SU/MU transmission. Accordingly, in the following specification, a method of configuring an EHT-SIG and a method of setting an interleaver therefor when transmitting a signal through preamble puncturing may be proposed. First, the PPDU of the EHT standard (i.e., the EHT PPDU) may be described first.

EHT PPDU Configuration

In order to support a transmission method based on the EHT standard, a new frame format may be used. When transmitting a signal through the 2.4/5/6 GHz band based on the new frame format, conventional Wi-Fi receivers (or STAs) (e.g., 802.11n) as well as receivers supporting the EHT standard receivers in compliance with the 802.11n/ac/ax standard) can also receive EHT signals transmitted through the 2.4/5/6 GHz band.

The preamble of the PPDU based on the EHT standard can be set in various ways. Hereinafter, an embodiment of configuring the preamble of the PPDU based on the EHT standard will be described. Hereinafter, a PPDU based on the EHT standard may be described as an EHT PPDU. However, the EHT PPDU is not limited to the EHT standard. The EHT PPDU may include not only the 802.11be standard (i.e., the EHT standard), but also a PPDU based on a new standard that is improved/evolved/extended with the 802.11be standard.

Figure 24:
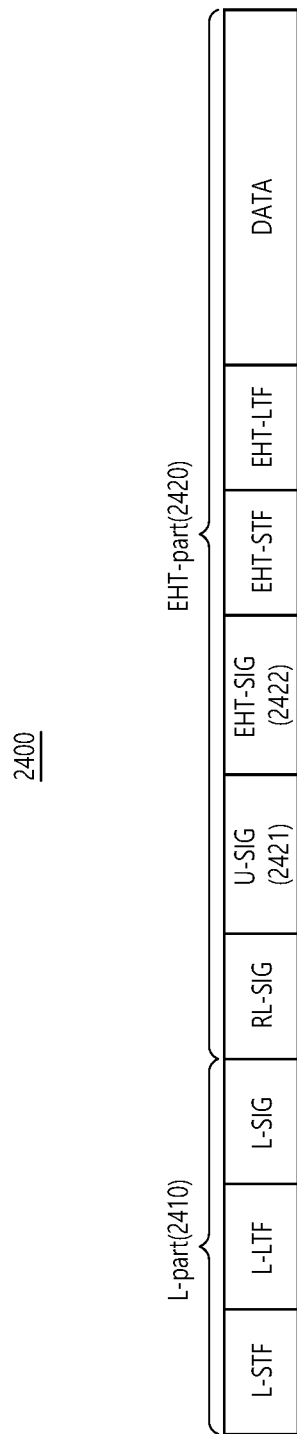
FIG. 24 shows an example of an EHT PPDU.

FIG. 24 shows an example of an EHT PPDU.

Referring to FIG. 24, an EHT PPDU 2400 may include an L-part 2410 and an EHT-part 2420. The EHT PPDU 2400 may be configured in a format to support backward compatibility. In addition, the EHT PPDU 2400 may be transmitted to a single STA and/or multiple STAs. The EHT PPDU 2400 may be an example of an MU-PPDU of the EHT standard.

The EHT PPDU 2400 may include the L-part 2410 preceding the EHT-part 2420 for coexistence or backward compatibility with a legacy STA (e.g., STA in compliance with the 802.11n/ac/ax standard). For example, the L-part 2410 may include L-STF, L-LTF, and L-SIG. For example, phase rotation may be applied to the L-part 2410.

According to an embodiment, the EHT part 2420 may include RL-SIG, U-SIG 2421, EHT-SIG 2422, EHT-STF, EHT-LTF, and data fields. Similar to the 11ax standard, RL-SIG may be included in the EHT part 2420 for L-SIG reliability and range extension. The RL-SIG may be transmitted immediately after the L-SIG, and may be configured to repeat the L-SIG.

For example, four additional subcarriers may be applied to L-SIG and RL-SIG. The extra subcarriers may be configured at subcarrier indices [−28, −27, 27, 28]. The extra subcarriers may be modulated in a BPSK scheme. In addition, coefficients of [−1 −1 −1 1] may be mapped to the extra subcarriers.

For example, the EHT-LTF may be one of 1×EHT-LTF, 2×EHT-LTF, or 4×EHT-LTF. The EHT standard may support EHT-LTF for 16 spatial streams.

According to an embodiment, the U-SIG 2421 may include a version independent field and a version dependent field. An example of the U-SIG 2421 may be described with reference to FIG. 25.

FIG. 25 shows an example of the U-SIG.

Referring to FIG. 25, the U-SIG 2500 may correspond to the U-SIG 2421 of FIG. 24. The U-SIG 2500 may include a Version independent field 2510 and a Version dependent field 2520.

According to an embodiment, the version independent field 2510 may include a 3-bit version identifier indicating the EHT standard and the Wi-Fi version being defined after the EHT standard. In other words, the version independent field 2510 may include 3 bits of information related to the EHT standard and the Wi-Fi version being defined after the EHT standard.

According to an embodiment, the Version independent field 2510 may further include a 1-bit DL/UL field, a BSS color field, and/or a TXOP duration field. In other words, the Version independent field 2510 may further include 1-bit information related to DL/UL, information related to the BSS color, and/or information related to the TXOP duration.

According to an embodiment, the version dependent field 2520 may include a field/information related to a PPDU format type, a field/information related to a bandwidth, and/or a field/information related to an MCS. For example, the field/information related to the Bandwidth may include puncturing information.

According to an embodiment, the U-SIG 2500 may consist of two symbols. The two symbols may be jointly encoded. According to an embodiment, the U-SIG 2500 may be configured with 52 data tones and 4 pilot tones for each 20 MHz. In addition, it may be modulated in the same manner as HE-SIG-A of the HE standard. For example, the U-SIG 2500 may be modulated with BPSK and a code rate of 1/2.

According to an embodiment, the U-SIG 2500 may be configured by duplication in units of 20 MHz for wide bandwidth transmission.

According to an embodiment, when the U-SIG 2500 is transmitted to multiple users, MCS information of the EHT-SIG or information related to the number of symbols of the EHT-SIG may be further included.

Referring back to FIG. 24, the EHT-SIG 2422 may include a version dependent field that is not included in the U-SIG 2421. In other words, the EHT-SIG 2422 may include information overflowed from the U-SIG 2421. For example, the EHT-SIG 2422 may include information dependent on the version of the PPDU. As another example, the EHT-SIG 2422 may include at least some of fields included in HE-SIG-A of the High Efficiency (HE) standard.

According to an embodiment, the EHT-SIG 2422 may consist of a plurality of OFDM symbols. According to an embodiment, the EHT-SIG 2422 may be modulated with various MCSs. For example, the EHT-SIG 2422 may be modulated based on MCS0 through MCS5.

According to an embodiment, the EHT-SIG 2422 may include a common field and a user specific field. For example, the common field may include information relate to a spatial stream and/or information related to RU allocation. For example, the user specific field may include at least one user block field including information related to the user. The user specific field may include/indicate information related to information ID, MCS, and coding used for a specific user or STA. As an example, the user specific field may include at least one user block field.

Preamble Puncturing Pattern and Multiple RU Combination

In the EHT standard, various preamble puncturing patterns and multiple RU combinations may be used. An example of preamble puncturing and multiple RU combination may be described below.

Hereinafter, an embodiment in consideration of the primary channel 20 MHz (i.e., P20) may be described. In this case, it can be assumed that the P20 is the lowest 20 MHz in the frequency domain. For example, it can be assumed that the P20 is the first 20 MHz channel (ch1) within 80 MHz [ch1 ch2 ch3 ch4]. According to an embodiment, the pattern may be configured/set differently according to the location of the primary channel.

In 80 MHz bandwidth, preamble puncturing patterns can be configured/set as shown in Table 27.

TABLE 27

| Aggregated BW | RU combination |
| --- | --- |
| 40 | 242 + 242 |
| 60 | 242 + 484, 484 + 242 |

Referring to Table 27, preamble puncturing of 40 MHz may be performed in an 80 MHz bandwidth. In this case, the RU combination may be set to 242+242.

Preamble puncturing of 20 MHz may be performed in the 80 MHz bandwidth, and in this case, the RU combination may be set to 242+484 or 484+242.

(2) In 160 MHz bandwidth, preamble puncturing patterns can be configured/set as shown in Table 28.

TABLE 28

| Aggregated BW | RU combination |
| --- | --- |
| 120 | 484 + 996 |
| 140 | 484 + 242 + 996 |

Referring to Table 28, 40 MHz preamble puncturing may be performed in a 160 MHz bandwidth, and in this case, the RU combination may be set to 484+996.

Preamble puncturing of 20 MHz may be performed in the 160 MHz bandwidth, and in this case, the RU combination may be set to 484+242+996.

(3) In 240 MHz bandwidth, preamble puncturing patterns can be configured/set as shown in Table 29.

TABLE 29

| Aggregated BW | RU combination |
| --- | --- |
| 160 | 996 + 996 |
| 200 | 484 + 996 + 996 |

Referring to Table 29, preamble puncturing of 80 MHz may be performed in a bandwidth of 240 MHz. In this case, the RU combination may be set to 996+996.

Preamble puncturing of 40 MHz may be performed in the 240 MHz bandwidth, and in this case, the RU combination may be set to 484+996+996.

(4) In 320 MHz bandwidth, preamble puncturing patterns can be configured/set as shown in Table 30.

TABLE 30

| Aggregated BW | RU combination |
| --- | --- |
| 240 | 996 + 996 + 996 |
| 280 | 484 + 996 + 996 + 996 |

Referring to Table 30, preamble puncturing of 80 MHz may be performed in a 320 MHz bandwidth. In this case, the RU combination may be set to 996+996+996.

Preamble puncturing of 40 MHz may be performed in a 320 MHz bandwidth, and in this case, the RU combination may be set to 484+996+996+996.

The above-described combination of RU aggregation and preamble puncturing is just one example, and more various combinations may be used to increase spectrum efficiency.

Configuration of EHT-SIG According to Preamble Puncturing Pattern and Multiple RU Combination In order to support multiple RU aggregation/preamble puncturing of the above combination, the EHT-SIG may be transmitted as follows.

According to an embodiment, the EHT-SIG may be configured in units of 80 MHz. In this case, the EHT-SIG may be transmitted using the remaining RU/BW except for the punctured part.

1-A. EHT-SIG may be configured to include independent information in units of 80 MHz for a bandwidth greater than 80 MHz.

For example, for 160 MHz, the EHT-SIG may be configured as two Content Channels (i.e., [1 2]). That is, the EHT-SIG may be configured as a Content Channel 1 and a Content Channel 2.

For example, for 240 MHz, the EHT-SIG may be configured as three Content Channels (i.e., [1 2 3]). That is, the EHT-SIG may be configured as a Content Channel 1, a Content Channel 2, and a Content Channel 3.

For example, for 320 MHz, the EHT-SIG may be configured as four Content Channels (i.e., [1 2 3 4]). That is, the EHT-SIG may be configured as a Content Channel 1, a Content Channel 2, a Content Channel 3, and a Content Channel 4.

1-B. The 80 MHz EHT-SIG Content Channel may be transmitted in the following structure in consideration of various puncturing patterns within 80 MHz. Hereinafter, information on 20 MHz allocated within 80 MHz may be indicated as [x1 x2 x3 x4]. Here, x1 to x4 may be set to 1 or 0. Each of x1 to x4 may be set to 1 when the corresponding 20 MHz channel is allocated. Each of x1 to x4 may be set to 0 when the corresponding 20 MHz channel is not allocated. That is, 'x1' may indicate whether the first 20 MHz is allocated within the 80 MHz bandwidth or whether preamble puncturing is applied.

1-B-i. 242+242 (i.e. [1 0 0 1], [1 0 1 0]) case

Figure 26:
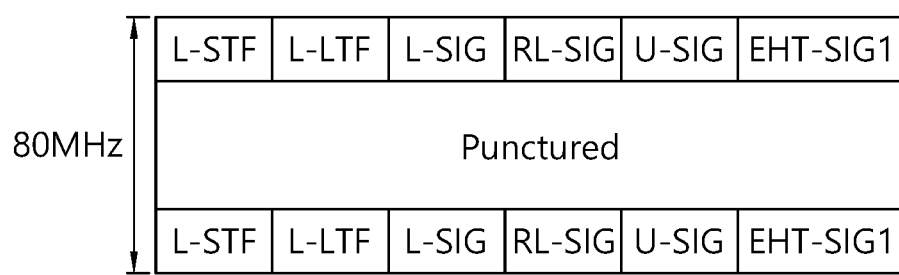
FIG. 26 shows an example of EHT-SIG for 80 MHz.

For example, for 80 MHz, the EHT-SIG may be transmitted as shown in FIG. 26.

FIG. 26 shows an example of EHT-SIG for 80 MHz.

Referring to FIG. 26, preamble puncturing may be performed in the structure of [1 0 0 1]. The EHT-SIG1 may be transmitted through the first 20 MHz and the last 20 MHz within 80 MHz.

1-B-ii. 242+484 (i.e. [1 0 1 1], [1 1 0 1], [1 1 1 0]) case

Figure 27:
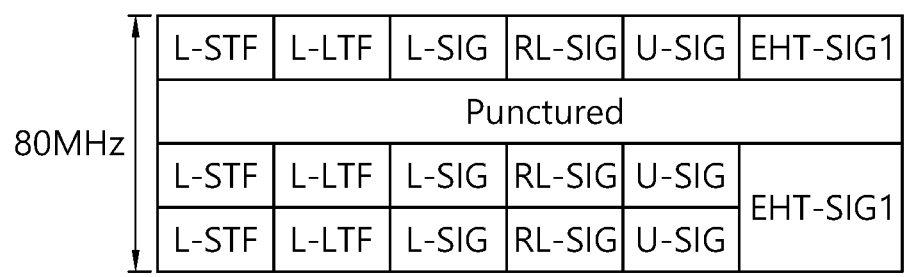
FIG. 27 shows another example of EHT-SIG for 80 MHz.

For example, for 80 MHz, the EHT-SIG may be transmitted as shown in FIG. 27.

FIG. 27 shows another example of EHT-SIG for 80 MHz.

Referring to FIG. 27, preamble puncturing may be performed in the structure of [1 0 1 1]. The EHT-SIG1 may be transmitted through the first 20 MHz, the third 20 MHz and the last 20 MHz within 80 MHz.

iii. In the above example, it may be assumed that the first 242 RUs (i.e., 242 RUs of the lowest frequency band) are the primary channel. In this case, 20 MHz for the allocated 242 RUs may be indicated by 1. 20 MHz corresponding to punctured 242 RUs may be indicated by 0.

iv. The above-described embodiment is exemplary, and the pattern display may be set differently according to the location of the primary channel.

v. The EHT-SIG may be transmitted using the remaining BWs except for the BW punctured within 80 MHz (configured in units of 20 MHz).

vi. According to the puncturing pattern, the EHT-SIG may be transmitted using 40/60 MHz, and in this case, information may be transmitted using data tones (data tones excluding pilot) of 52+52/52+108, respectively. In this case, the EHT-SIG information bit carried in the data tone may be encoded through one BCC and one BCC interleaver.

For example, for interleaving the information bits carried in the 52+52/52+108 data tone, Ncol and Nrow of the BCC interleaver may be set as shown in Table 31.

TABLE 31

|  |  | 52 + 52 | 52 + 108 |
|---|---|---|---|
| W/o DCM | Ncol | 13 | 32/20/16 |
|  | Nrow | 8 | 5/8/10 |
| w/DCM | Ncol | 13 | 16/10 |
|  | Nrow | 4 | 5/8 |

Referring to Table 31, when DCM is applied (i.e., w/DCM) and when DCM is not applied (i.e., W/o DCM), Ncol and Nrow values may be set differently.

For example, when DCM is not applied in 52+52 tone, the value of Ncol may be set to 13 and the value of Nrow may be set to 8.

For example, when DCM is applied in 52+52 tone, the value of Ncol may be set to 13 and the value of Nrow may be set to 4.

For example, when DCM is not applied in 52+108 tones, the value of Ncol may be set to 32 and the value of Nrow may be set to 5.

For example, when DCM is not applied in 52+108 tones, the value of Ncol may be set to 20 and the value of Nrow may be set to 8.

For example, when DCM is not applied in 52+108 tones, the value of Ncol may be set to 16 and the value of Nrow may be set to 10.

For example, when DCM is applied in 52+108 tones, the value of Ncol may be set to 16 and the value of Nrow may be set to 5.

For example, when DCM is applied in 52+108 tones, the value of Ncol may be set to 10 and the value of Nrow may be set to 8.

1-C. The STA may check the puncturing pattern of the EHT-SIG by using information related to the puncturing pattern configured in units of 80 MHz of the U-SIG or BW information.

1-D. Unlike the above-described embodiment, the EHT-SIG is configured in units of 80 MHz and may be transmitted in the following manner.

1-D-i. EHT-SIG may be configured as an EHT-SIG Content Channel of 20 MHz within 80 MHz. The Content Channel may be configured as follows.

1-D-i-1. The EHT-SIG may be composed of a common field and a user specific field regardless of the SU/MU PPDU. For example, a Content Channel may be configured differently according to SU/MU. As an example, the SU PPDU may consist of only a common field.

1-D-i-2. Two EHT-SIG Content Channels may exist on 80 MHz. For example, each Content Channel may include different information. In addition, the two Content Channels may be transmitted in the structure shown in FIG. 28 repeatedly within the 80 MHz in units of 40 MHz.

Figure 28:
FIG. 28 shows another example of EHT-SIG for 80 MHz.

FIG. 28 shows another example of EHT-SIG for 80 MHz.

Referring to FIG. 28, the EHT-SIG may be configured as two Content Channels (EHT-SIG1 and EHT-SIG2). The 80 MHz may be divided into units of 40 MHz. The EHT-SIG1 and EHT-SIG2 may be transmitted through the first 40 MHz. The EHT-SIG1 and EHT-SIG2 may be transmitted through the second 40 MHz. That is, the two Content Channels may be transmitted with duplication within 80 MHz in units of 40 MHz.

1-D-i-3. When BW>80 MHz, the EHT-SIG field may be configured as two different Content Channels per 80 MHz.

1-D-i-3-a. For 160 MHz, the EHT-SIG may be transmitted in the structure shown in FIG. 29.

Figure 29:
FIG. 29 shows an example of EHT-SIG for 160 MHz.

FIG. 29 shows an example of EHT-SIG for 160 MHz.

Referring to FIG. 29, the EHT-SIG may be configured as four Content Channels (EHT-SIG1 to EHT-SIG4). The 160 MHz may be divided into 80 MHz units. The EHT-SIG1 and EHT-SIG2 may be transmitted through the first 80 MHz. The EHT-SIG1 and EHT-SIG2 may transmitted with duplication within 80 MHz in units of 40 MHz.

The EHT-SIG3 and EHT-SIG4 may be transmitted through the second 80 MHz. EHT-SIG3 and EHT-SIG4 may be transmitted with duplication within 80 MHz in units of 40 MHz.

1-D-i-3-b. For 240 MHz, the EHT-SIG may be transmitted in the structure shown in FIG. 30.

FIG. 30 shows an example of EHT-SIG for 240 MHz.

Referring to FIG. 30, the EHT-SIG may be configured as six Content Channels (EHT-SIG1 to EHT-SIG6). The 240 MHz may be divided into 80 MHz units. The EHT-SIG1 and EHT-SIG2 may be transmitted through the first 80 MHz. The EHT-SIG1 and EHT-SIG2 may be transmitted with duplication within 80 MHz in units of 40 MHz.

The EHT-SIG3 and EHT-SIG4 may be transmitted through the second 80 MHz. EHT-SIG3 and EHT-SIG4 may be transmitted with duplication within 80 MHz in units of 40 MHz.

The EHT-SIG5 and EHT-SIG6 may be transmitted through the third 80 MHz. The EHT-SIG5 and EHT-SIG6 may be transmitted with duplication within 80 MHz in units of 40 MHz.

1-D-i-3-c. For 320 MHz, the EHT-SIG may be transmitted in the structure shown in FIG. 31.

FIG. 31 shows an example of EHT-SIG for 320 MHz.

Referring to FIG. 31, the EHT-SIG may be configured as eight Content Channels (EHT-SIG1 to EHT-SIG8). The 320 MHz may be divided in units of 80 MHz. The EHT-SIG1 and EHT-SIG2 may be transmitted through the first 80 MHz. The EHT-SIG1 and EHT-SIG2 may be transmitted with duplication within 80 MHz in units of 40 MHz.

The EHT-SIG3 and EHT-SIG4 may be transmitted through the second 80 MHz. The EHT-SIG3 and EHT-SIG4 may be transmitted with duplication within 80 MHz in units of 40 MHz.

The EHT-SIG5 and EHT-SIG6 may be transmitted through the third 80 MHz. The EHT-SIG5 and EHT-SIG6 may be transmitted with duplication within 80 MHz in units of 40 MHz.

The EHT-SIG7 and EHT-SIG8 may be transmitted through the fourth 80 MHz. The EHT-SIG5 and EHT-SIG6 may be transmitted with duplication within 80 MHz in units of 40 MHz.

1-D-ii. According to an embodiment, the EHT-SIG Content Channel/EHT-SIG field may be configured in units of 20 MHz. The EHT-SIG may be configured and transmitted as follows.

1-D-ii-1. The EHT-SIG (or EHT-SIG Content Channel) may be transmitted by duplication in 20 MHz units within 80 MHz.

1-D-ii-1-a. For 80 MHz, the EHT-SIG may be transmitted in the structure shown in FIG. 32.

Figure 32:
FIG. 32 shows another example of EHT-SIG for 80 MHz.

FIG. 32 shows another example of EHT-SIG for 80 MHz.

Referring to FIG. 32, the EHT-SIG may be configured as one Content Channel (EHT-SIG1). The EHT-SIG1 is configured on 20 MHz, and may be transmitted with duplication in 20 MHz units within 80 MHz.

1-D-ii-2. According to an embodiment, the EHT-SIG (or EHT-SIG Content Channel) may be configured differently in units of 80 MHz.

1-D-ii-2-a. For 160 MHz, the EHT-SIG may be transmitted in the structure shown in FIG. 33.

Figure 33:
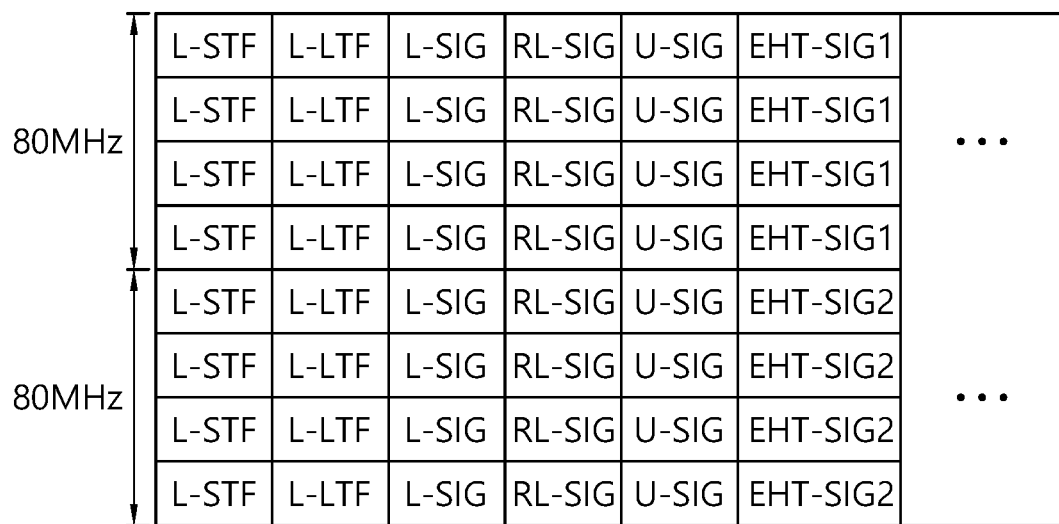
FIG. 33 shows another example of EHT-SIG for 160 MHz.

FIG. 33 shows another example of EHT-SIG for 160 MHz.

Referring to FIG. 33, the EHT-SIG may be configured as two Content Channels (EHT-SIG1 and EHT-SIG2). The 160 MHz may be divided into 80 MHz units.

The EHT-SIG1 may be transmitted through the first 80 MHz. The EHT-SIG1 is configured on 20 MHz, and may be transmitted with duplication in 20 MHz units within 80 MHz.

EHT-SIG2 may be transmitted through the second 80 MHz. EHT-SIG2 is configured on 20 MHz, and may be transmitted with duplication in 20 MHz units within 80 MHz.

1-D-ii-2-b. For 240 MHz, the EHT-SIG may be transmitted in the structure shown in FIG. 34.

FIG. 34 shows another example of EHT-SIG for 240 MHz.

Referring to FIG. 34, the EHT-SIG may be configured as three Content Channels (EHT-SIG1 to EHT-SIG3). The 240 MHz may be divided into 80 MHz units.

The EHT-SIG1 may be transmitted through the first 80 MHz. The EHT-SIG1 is configured on 20 MHz, and may be transmitted with duplication in 20 MHz units within 80 MHz.

The EHT-SIG2 may be transmitted through the second 80 MHz. The EHT-SIG2 is configured on 20 MHz, and may be transmitted with duplication in 20 MHz units within 80 MHz.

The EHT-SIG3 may be transmitted through the third 80 MHz. The EHT-SIG3 is configured on 20 MHz, and may be transmitted with duplication in 20 MHz units within 80 MHz.

1-D-ii-2-c. For 320 MHz, the EHT-SIG may be transmitted in the structure shown in FIG. 35.

FIG. 35 shows another example of EHT-SIG for 320 MHz.

Referring to FIG. 35, the EHT-SIG may be configured as four Content Channels (EHT-SIG1 to EHT-SIG4). 320 MHz may be divided in units of 80 MHz.

The EHT-SIG1 may be transmitted through the first 80 MHz. The EHT-SIG1 is configured on 20 MHz, and may be transmitted with duplication in 20 MHz units within 80 MHz.

The EHT-SIG2 may be transmitted through the second 80 MHz. The EHT-SIG2 is configured on 20 MHz, and may be transmitted with duplication in 20 MHz units within 80 MHz.

The EHT-SIG3 may be transmitted through the third 80 MHz. The EHT-SIG3 is configured on 20 MHz, and may be transmitted with duplication in 20 MHz units within 80 MHz.

The EHT-SIG4 may be transmitted through the fourth 80 MHz. The EHT-SIG4 is configured on 20 MHz, and may be transmitted with duplication in 20 MHz units within 80 MHz.

1-D-ii-3. Unlike the above-described embodiment, during SU transmission, the EHT-SIG (or EHT-SIG Content Channel) may be transmitted with duplication in units of 20 MHz.

1-D-ii-3-a. For example, The EHT-SIG (or EHT-SIG Content Channel) for 320 MHz may be configured and transmitted as shown in FIG. 36.

FIG. 36 shows another example of EHT-SIG for 320 MHz.

Referring to FIG. 36, the EHT-SIG may be configured as one Content Channel (i.e., EHT-SIG1). The EHT-SIG1 is configured on 20 MHz, and may be transmitted with duplication in 20 MHz units within 320 MHz.

1-D-ii-3-b. As shown in FIG. 36, the EHT-SIG may be configured and transmitted in the same manner for 160 MHz and 240 MHz.

1-D-ii-4. According to the above-described embodiments, it is possible to use an existing interleaver, so there is an effect that there is no need to change additional hardware.

1-E. The EHT-SIG may be configured differently according to the SU PPDU and the MU PPDU.

For example, in the case of SU transmission, the EHT-SIG may be configured as a 20 MHz EHT-SIG Content Channel. The EHT-SIG may be transmitted by being duplicated in the transmission BW.

For another example, in the case of MU-PPDU, the EHT-SIG may be configured in units of per 80 MHz or per 160 MHz. In this case, it may be transmitted using two independent EHT-SIG Content Channels.

1-E-i. Hereinafter, for 240 MHz transmission, an example of the configuration of the EHT-SIG may be described. Here, 1, 2, 3, 4, 5, 6 may mean an independent 20 MHz Content Channel.

1-E-i-1. The EHT-SIG of SU PPDU may have a structure of [1 1 1 1 1 1 1 1 1 1 1 1]. That is, in the SU transmission, the EHT-SIG may be transmitted by duplicating one Content Channel.

1-E-i-2. The EHT-SIG of MU PPDU may be configured as two Content Channels.

For example, when the EHT-SIG is configured for every 80 MHz Per 80 MHz, the EHT-SIG may be configured in the structure of [1 2 1 2 3 4 3 4 5 6 5 6].

For another example, when the EHT-SIG is configured for every 160 MHz, the EHT-SIG may be configured in a structure of [1 2 1 2 1 2 1 2 3 4 3 4].

2. According to an embodiment, the EHT-SIG (or EHT-SIG Content Channel) may be configured in units of 20 MHz, and may be configured and transmitted as follows.

2-A. For example, the EHT-SIG may be configured as an independent SIG including other information in units of 160 MHz, and in this case, the EHT-SIG constituting each 160 MHz may be configured as follows.

2-A-i. The EHT-SIG may be configured as an EHT-SIG Content Channel configured as 20 MHz within 80 MHz. The EHT-SIG Content Channel may be configured as two channels on 80 MHz. Each Content Channel may include different information. In addition, the two Content Channels may be duplicated within 80 MHz in units of 40 MHz and transmitted in the following structure.

2-A-i-1. For example, for 80 MHz, the EHT-SIG (or EHT-SIG Content Channel) may be configured and transmitted as shown in FIG. 37.

Figure 37:
FIG. 37 shows another example of EHT-SIG for 80 MHz.

FIG. 37 shows another example of EHT-SIG for 80 MHz.

Referring to FIG. 37, the EHT-SIG may be configured as two Content Channels (EHT-SIG1 and EHT-SIG2). The 80 MHz may be divided into units of 40 MHz. The EHT-SIG1 and EHT-SIG2 may be transmitted through the first 40 MHz. The EHT-SIG1 and EHT-SIG2 may be transmitted through the second 40 MHz. That is, the two Content Channels may be transmitted with duplication within 80 MHz in units of 40 MHz.

2-A-i-2. For example, for 160 MHz, the EHT-SIG (or EHT-SIG Content Channel) may be configured and transmitted as shown in FIG. 38.

Figure 38:
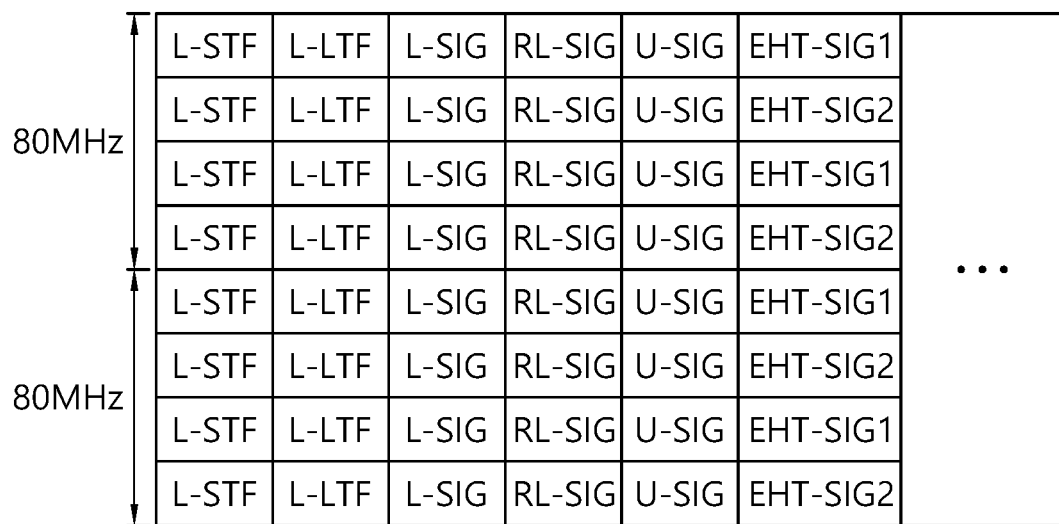
FIG. 38 shows another example of EHT-SIG for 160 MHz.

FIG. 38 shows another example of EHT-SIG for 160 MHz.

Referring to FIG. 38, the EHT-SIG may be configured as two Content Channels (EHT-SIG1 and EHT-SIG2). The 160 MHz may be divided into 80 MHz units. The EHT-SIG1 and EHT-SIG2 may be transmitted through the first 80 MHz. The EHT-SIG1 and EHT-SIG2 may be transmitted through the second 80 MHz. That is, the two Content Channels may be transmitted with duplication within 80 MHz in units of 40 MHz.

2-A-i-3. When BW>160 MHz, the EHT-SIG may be configured differently in units of 160 MHz. For example, two EHT-SIG Content Channels within 160 MHz may include different information. The two Content Channels are duplicated within 80 MHz in units of 40 MHz and may be configured as follows.

2-A-i-2. For example, for 240 MHz, the EHT-SIG (or EHT-SIG Content Channel) may be configured and transmitted as shown in FIG. 39.

FIG. 39 shows another example of EHT-SIG for 240 MHz.

Referring to FIG. 39, the EHT-SIG may be configured differently in units of 160 MHz.

Two Content Channels (i.e., EHT-SIG1, EHT-SIG2) may be transmitted through the first 160 MHz of 240 MHz. Two Content Channels (i.e., EHT-SIG1, EHT-SIG2) may be transmitted with duplication within 80 MHz (or 160 MHz) in units of 40 MHz.

In addition, two Content Channels (i.e., EHT-SIG3, EHT-SIG4) may be transmitted through the remaining 80 MHz. Two Content Channels (i.e., EHT-SIG3, EHT-SIG4) may be transmitted with duplication within 80 MHz in units of 40 MHz. Accordingly, for 240 MHz, the EHT-SIG may be configured as four Content Channels.

2-A-i-3. For example, for 320 MHz, the EHT-SIG (or EHT-SIG Content Channel) may be configured and transmitted as shown in FIG. 40.

FIG. 40 shows another example of EHT-SIG for 320 MHz.

Referring to FIG. 40, the EHT-SIG may be configured differently in units of 160 MHz.

Two Content Channels (i.e., EHT-SIG1 and EHT-SIG2) may be transmitted through the first 160 MHz of 320 MHz. Two Content Channels (i.e., EHT-SIG1, EHT-SIG2) may be transmitted with duplication within 80 MHz (or 160 MHz) in units of 40 MHz.

In addition, two Content Channels (i.e., EHT-SIG3, EHT-SIG4) may be transmitted through the second 160 MHz. The Content Channels (i.e., EHT-SIG3, EHT-SIG4) may be transmitted with duplication within 80 MHz (or 160 MHz) in units of 40 MHz. Accordingly, for 320 MHz, the EHT-SIG may be configured as four Content Channels.

Hereinafter, operations of the transmitting STA and the receiving STA according to the above-described embodiments may be described.

Figure 41:
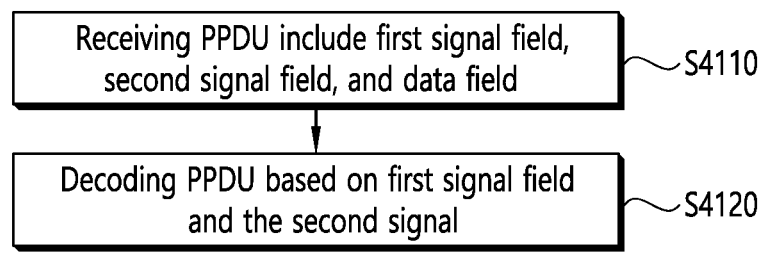
FIG. 41 is a flowchart for explaining an operation of a receiving STA.

FIG. 41 is a flowchart for explaining an operation of a receiving STA.

Referring to FIG. 41, in step S4110, the receiving STA may receive a PPDU including a first signal field, a second signal field, and a data field. For example, the first signal field may include a U-SIG. For example, the second signal field may include an EHT-SIG.

According to an embodiment, the PPDU may be received based on the first bandwidth. For example, the PPDU may include an EHT PPDU. For example, the entire/whole bandwidth of the PPDU may be set as the first bandwidth.

According to an embodiment, the first signal field may include information related to the EHT PPDU. For example, the first signal field may include information related to a version of the PPDU. In addition, the first signal field may include information related to basic service set (BSS) color and/or information related to transmission opportunity (TXOP).

For example, the first signal field may include 3-bit information related to the version of the PPDU. The 3-bit information about the version of the PPDU may include information indicating that the EHT PPDU is a PPDU configured based on the EHT standard. In addition, the 3-bit information related to the version of the PPDU may include information for distinguishing the PPDU configured based on a later version of the 802.11be standard (i.e., the EHT standard). In other words, the 3-bit information related to the version of the PPDU may include information for distinguishing a PPDU configured based on EHT standard from a PPDU configured based on a new standard determined/generated/established after the EHT standard. That is, the 3-bit information about the version of the PPDU may include information indicating that the PPDU is a PPDU of an EHT standard or a PPDU of a later standard after the EHT standard.

According to an embodiment, the type of the PPDU and the version of the PPDU may be used separately. The type of PPDU may be used to distinguish the PPDU according to the EHT standard and the standard before the EHT standard (e.g., 802.11n/ac/ax). On the other hand, the version of the PPDU may be used to distinguish the PPDU according to the EHT standard and the standard after the EHT standard. For example, the version of the PPDU may be called variously. For example, the version of the PPDU may be referred to as a PHY version, a Packet version, a Packet identifier, and a Wi-Fi version.

According to an embodiment, the first signal field may further include first cyclic redundancy check (CRC) bits and first tail bits related to the first signal field. The first CRC bits may be used for valid check by the receiving STA. For example, the first CRC bits may consist of 4 bits. For example, the first tail bits may consist of 6 bits.

According to an embodiment, the second signal field may be received consecutively to the first signal field. For example, the first signal field may be received through two symbols. The second signal field may be received through at least one symbol contiguous to the two symbols.

According to an embodiment, the PPDU may be configured to be transmitted to a single user. For example, the data field included in the PPDU may include only information transmitted to a single user. Accordingly, the PPDU may be configured to be transmitted only to the receiving STA. For example, the data field included in the PPDU may include information transmitted only to the receiving STA.

In this case, the second signal field may be configured by being duplicated in units of the second bandwidth within the first bandwidth. For example, the second bandwidth may be set to 20 MHz.

For example, the second signal field may be configured as one Content Channel (hereinafter, referred to as a first Content Channel). The first Content Channel may be configured by being duplicated in units of a second bandwidth within the first bandwidth. That is, the first Content Channel may be configured by being duplicated in units of 20 MHz within the first bandwidth that is the entire/whole bandwidth of the PPDU. Accordingly, the first Content Channel may be identically configured within the entire bandwidth of the PPDU in units of 20 MHz.

According to an embodiment, the second signal field may include a common field and a user-specific field. For example, the common field may include information overflowed from the first signal field. When the PPDU is configured to be transmitted to a single user, the user specific field may include only a subfield related to the single user.

In step S4120, the receiving STA may decode the PPDU based on the first signal field and the second signal field.

Unlike the above-described embodiment, the PPDU may be configured to be transmitted to multi-users. In this case, the second signal field may be configured in units of 80 MHz. The second signal field may be configured as two Content Channels per 80 MHz.

For example, in the PPDU of 160 MHz, the 160 MHz may be divided into two 80 MHz.

In the first 80 MHz, the second signal field may be configured as a first Content Channel and a second Content Channel Each of the first Content Channel and the second Content Channel may be configured on 20 MHz. The first Content Channel and the second Content Channel may be sequentially positioned within the first 80 MHz. That is, the second signal field may be positioned in the order of the first Content Channel, the second Content Channel, the first Content Channel, and the second Content Channel within the first 80 MHz.

In the second 80 MHz, the second signal field may be configured as a third Content Channel and a fourth Content Channel Each of the third Content Channel and the fourth Content Channel may be configured on 20 MHz. The third Content Channel and the fourth Content Channel may be sequentially positioned within the second 80 MHz. That is, the second signal field may be positioned in the order of the third Content Channel, the fourth Content Channel, the third Content Channel, and the fourth Content Channel within the second 80 MHz.

Figure 42:
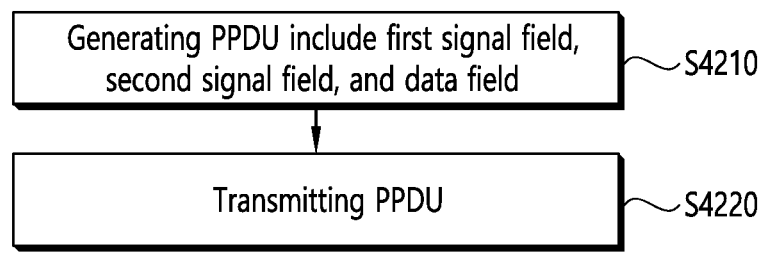
FIG. 42 is a flowchart for explaining an operation of a transmitting STA.

FIG. 42 is a flowchart for explaining an operation of a transmitting STA.

Referring to FIG. 42, in step S4210, the transmitting STA may generate a PPDU including a first signal field, a second signal field, and a data field. For example, the PPDU may include an EHT PPDU. For example, the first signal field may include a U-SIG. For example, the second signal field may include an EHT-SIG.

According to an embodiment, the first signal field may include information related to the EHT PPDU. For example, the first signal field may include information related to a version of the PPDU. As an example, the first signal field may include 3-bit information related to a version of the PPDU. In addition, the first signal field may include information related to a basic service set (BSS) color and/or information related to transmission opportunity (TXOP).

According to an embodiment, the PPDU may be configured to be transmitted to a single user. For example, the data field included in the PPDU may include only information transmitted to a single user. Accordingly, the PPDU may be configured to be transmitted only to the receiving STA. For example, the data field included in the PPDU may include information transmitted only to the receiving STA.

In this case, the second signal field may be configured by being duplicated in units of the second bandwidth within the first bandwidth. For example, the second bandwidth may be set to 20 MHz.

For example, the second signal field may be configured as one Content Channel (hereinafter, referred to as a first Content Channel). The first Content Channel may be configured by being duplicated in units of a second bandwidth within the first bandwidth. That is, the first Content Channel may be configured by being duplicated in units of 20 MHz within the first bandwidth that is the entire/whole bandwidth of the PPDU. Accordingly, the first Content Channel may be identically configured within the entire bandwidth of the PPDU in units of 20 MHz.

According to an embodiment, the second signal field may include a common field and a user-specific field. For example, the common field may include information overflowed from the first signal field. When the PPDU is configured to be transmitted to a single user, the user specific field may include only a subfield related to the single user.

In step S4220, the transmitting STA may transmit a PPDU. According to an embodiment, the transmitting STA may transmit a PPDU including a first signal field, a second signal field, and a data field.

According to an embodiment, the PPDU may be transmitted based on the first bandwidth. For example, the entire bandwidth of the PPDU may be set as the first bandwidth.

According to an embodiment, the second signal field may be continuously transmitted to the first signal field. For example, the first signal field may be transmitted over two symbols. The second signal field may be transmitted through at least one symbol contiguous to the two symbols.

Unlike the above-described embodiment, the PPDU may be configured to be transmitted to multi-users. In this case, the second signal field may be configured in units of 80 MHz. The second signal field may be configured as two Content Channels per 80 MHz.

For example, in the PPDU of 160 MHz, the 160 MHz may be divided into two 80 MHz.

In the first 80 MHz, the second signal field may be configured as a first Content Channel and a second Content Channel Each of the first Content Channel and the second Content Channel may be configured on 20 MHz. The first Content Channel and the second Content Channel may be sequentially positioned within the first 80 MHz. That is, the second signal field may be positioned in the order of the first Content Channel, the second Content Channel, the first Content Channel, and the second Content Channel within the first 80 MHz.

In the second 80 MHz, the second signal field may be configured as a third Content Channel and a fourth Content Channel Each of the third Content Channel and the fourth Content Channel may be configured on 20 MHz. The third Content Channel and the fourth Content Channel may be sequentially positioned within the second 80 MHz. That is, the second signal field may be positioned in the order of the third Content Channel, the fourth Content Channel, the third Content Channel, and the fourth Content Channel within the second 80 MHz.

Accordingly, the transmitting STA may transmit the PPDU configured to be transmitted to the aforementioned multi-user to the receiving STA.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or may be implemented based on the processor 610 and the memory 620 of FIG. 19. For example an apparatus of the present disclosure may comprise: a processor; and a memory coupled to the processor, wherein the processor is adapted to: receive Physical layer Protocol Data Unit (PPDU) including a first signal field, a second signal field, and a data field, wherein the PPDU is transmitted to a single user, wherein the PPDU is received based on a first bandwidth, wherein the second signal field is configured as one content channel, wherein the one content channel is configured by being duplicated in units of a second bandwidth within the first bandwidth; and decode the PPDU based on the first signal field and the second signal field.

The technical features of the present specification may be implemented based on a computer readable medium (CRM). For example, the CRM proposed by the present specification may store instructions that, based on being executed by at least one processor, perform operations comprising: receiving a Physical layer Protocol Data Unit (PPDU) including a first signal field, a second signal field, and a data field, wherein the PPDU is transmitted to a single user, wherein the PPDU is received based on a first bandwidth, wherein the second signal field is configured as one content channel, wherein the one content channel is configured by being duplicated in units of a second bandwidth within the first bandwidth; and decoding the PPDU based on the first signal field and the second signal field.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a receiving station (STA) in a wireless local area network (WLAN), the method comprising:
receiving an Extremely High Throughput Physical Protocol Data Unit (EHT PPDU) including a legacy signal (L-SIG) field, a repeated legacy signal (RL-SIG) field, a universal signal (U-SIG) field, an EHT signal (EHT-SIG) field, and a data field,
wherein a length field of the L-SIG field includes a value,
wherein the value satisfies a condition that a remainder is zero (0) when the length field is divided by three (3), and the remainder is used to differentiate the EHT PPDU from a High Efficiency (HE) PPDU,
wherein four extra subcarriers are for the RL-SIG field, indices of the four extra subcarriers are {−28, −27, +27, +28}, values of the four extra subcarriers are {−1, −1, −1, 1}, respectively, and the RL-SIG field includes 24-bit information,
wherein the U-SIG field includes version independent fields followed by version dependent fields,
wherein the version independent fields include 3-bit information related to a physical (PHY) version of the EHT PPDU,
wherein the version dependent fields include type information related to the EHT PPDU,
wherein the U-SIG field has a length of two symbols,
wherein the U-SIG field is allocated to a plurality of subcarriers with indices from −28 to +28, the plurality of subcarriers include four pilot subcarriers, and indices of the four pilot subcarriers are {−21, −7, +7, +21},
wherein the EHT-SIG field is contiguous to the U-SIG field,
wherein based on the EHT PPDU being related to single user (SU) transmission, the EHT-SIG field has a single EHT-SIG content channel regardless of a bandwidth of the EHT PPDU,
wherein information on preamble puncturing for the PPDU within 80 MHz is indicated as [x1 x2 x3 x4], each of x1, x2, x3, and x4 includes information related to preamble puncturing on a corresponding 20 MHz channel, each of x1, x2, x3, and x4 has a value of zero (0) for a corresponding 20 MHz channel being punctured, and the information on the preamble puncturing is included in the U-SIG field; and
decoding the PPDU based on the U-SIG field and the EHT-SIG field.

2. The method of claim 1, wherein the type information has a length of two bits.

3. The method of claim 1, wherein the EHT-SIG field includes a common field and a user specific field.

4. The method of claim 1, wherein the EHT-SIG field has a length of at least one symbol.

5. A method in a transmitting station (STA) in a wireless local area network (WLAN), the method comprising:
generating an Extremely High Throughput Physical Protocol Data Unit (EHT PPDU) including a legacy signal (L-SIG) field, a repeated legacy signal (RL-SIG) field, a universal signal (U-SIG) field, an EHT signal (EHT-SIG) field, and a data field,
wherein a length field of the L-SIG field includes a value, wherein the value satisfies a condition that a remainder is zero (0) when the length field is divided by three (3), and the remainder is used to differentiate the EHT PPDU from a High Efficiency (HE) PPDU,
wherein four extra subcarriers are for the RL-SIG field, indices of the four extra subcarriers are {−28, −27, +27, +28}, values of the four extra subcarriers are {−1, −1, −1, 1}, respectively, and the RL-SIG field includes 24-bit information, wherein the U-SIG field includes version independent fields followed by version dependent fields,
wherein the version independent fields include 3-bit information related to a physical (PHY) version of the EHT PPDU,
wherein the version dependent fields include type information related to the EHT PPDU,
wherein the U-SIG field has a length of two symbols,
wherein the U-SIG field is allocated to a plurality of subcarriers with indices from −28 to +28, the plurality of subcarriers include four pilot subcarriers, and indices of the four pilot subcarriers are {−21, −7, +7, +21},
wherein the EHT-SIG field is contiguous to the U-SIG field,
wherein based on the EHT PPDU being related to single user (SU) transmission, the EHT-SIG field has a single EHT-SIG content channel regardless of a bandwidth of the EHT PPDU,
wherein information for the PPDU within 80 MHz is indicated as [x1 x2 x3 x4], each of x1, x2, x3, and x4 includes information related to preamble puncturing on a corresponding 20 MHz channel, each of x1, x2, x3, and x4 has a value of zero (0) for a corresponding 20 MHz channel being punctured, and the information on the preamble puncturing is included in the U-SIG field; and
transmitting the PPDU.

6. The method of claim 5, wherein the type information has a length of two bits.

7. The method of claim 5, wherein the EHT-SIG field includes a common field and a user specific field.

8. The method of claim 5, wherein the EHT-SIG field has a length of at least one symbol.

9. A receiving station (STA) in a wireless local area network (WLAN), comprising:
a transceiver adapted to transmit and/or receive a wireless signal;
a processor coupled to the transceiver,
wherein the processor is adapted to:
receive an Extremely High Throughput Physical Protocol Data Unit (EHT PPDU) including a legacy signal (L-SIG) field, a repeated legacy signal (RL-SIG) field, a universal signal (U-SIG) field, an EHT signal (EHT-SIG) field, and a data field,
wherein a length field of the L-SIG field includes a value,
wherein the value satisfies a condition that a remainder is zero (0) when the length field is divided by three (3), and the remainder is used to differentiate the EHT PPDU from a High Efficiency (HE) PPDU, wherein four extra subcarriers are for the RL-SIG field, indices of the four extra subcarriers are {−28, −27, +27, +28}, values of the four extra subcarriers are {−1, −1, −1, 1}, respectively, and the RL-SIG field includes 24-bit information, wherein the U-SIG field includes version independent fields followed by version dependent fields, wherein the version independent fields include 3-bit information related to a physical (PHY) version of the EHT PPDU, wherein the version dependent fields include type information related to the EHT PPDU, wherein the U-SIG field has a length of two symbols, wherein the U-SIG field is allocated to a plurality of subcarriers with indices from −28 to +28, the plurality of subcarriers include four pilot subcarriers, and indices of the four pilot subcarriers are {−21,−7, +7, +21}, wherein the EHT-SIG field is contiguous to the U-SIG field, wherein based on the EHT PPDU being related to single user (SU) transmission, the EHT-SIG field has a single EHT-SIG content channel regardless of a bandwidth of the EHT PPDU, wherein information on preamble puncturing for the PPDU within 80 MHz is indicated as [x1 x2 x3 x4], each of x1, x2, x3, and x4 includes information related to preamble puncturing on a corresponding 20 MHz channel, each of x1, x2, x3, and x4 has a value of zero (0) for a corresponding 20 MHz channel being punctured, and the information on the preamble puncturing is included in the U-SIG field; and decode the PPDU based on the U-SIG field and the EHT-SIG field.

10. The receiving STA of claim 9, wherein the type information has a length of two bits.

11. The receiving STA of claim 9, wherein the EHT-SIG field includes a common field and a user specific field.

12. The receiving STA of claim 9, wherein the EHT-SIG field has a length of at least one symbol.

* * * * *